(12) United States Patent
Scholten et al.

(10) Patent No.: US 11,751,743 B2
(45) Date of Patent: Sep. 12, 2023

(54) AUTONOMOUS VACUUM CLEANER

(71) Applicant: BISSELL Inc., Grand Rapids, MI (US)

(72) Inventors: Jeffrey A. Scholten, Grand Rapids, MI (US); Jake Andrew Mohan, Grand Rapids, MI (US); Andrew James Brouwers, Grand Rapids, MI (US); Eric Daniel Buehler, Grand Rapids, MI (US); James Joseph Minnema, Jr., Hudsonville, MI (US); Derek Everett Smith, Grand Rapids, MI (US); David VanKampen, Grand Rapids, MI (US)

(73) Assignee: BISSELL Inc., Grand Rapids, MI (US)

( * ) Notice: Subject to any disclaimer, the term of this patent is extended or adjusted under 35 U.S.C. 154(b) by 159 days.

(21) Appl. No.: 16/794,814

(22) Filed: Feb. 19, 2020

(65) Prior Publication Data
US 2020/0178746 A1   Jun. 11, 2020

Related U.S. Application Data

(62) Division of application No. 15/705,781, filed on Sep. 15, 2017, now Pat. No. 10,595,694.

(60) Provisional application No. 62/395,674, filed on Sep. 16, 2016.

(51) Int. Cl.
| A47L 9/28 | (2006.01) |
| A47L 9/00 | (2006.01) |
| A47L 9/04 | (2006.01) |
| A47L 9/16 | (2006.01) |

(52) U.S. Cl.
CPC ............. *A47L 9/2805* (2013.01); *A47L 9/009* (2013.01); *A47L 9/0411* (2013.01); *A47L 9/0477* (2013.01); *A47L 9/1683* (2013.01); *A47L 9/2852* (2013.01); *A47L 2201/022* (2013.01); *A47L 2201/04* (2013.01)

(58) Field of Classification Search
None
See application file for complete search history.

(56) References Cited

U.S. PATENT DOCUMENTS

| 6,901,624 | B2 | 6/2005 | Mori et al. |
| 7,429,843 | B2 | 9/2008 | Jones et al. |
| 7,769,490 | B2 | 8/2010 | Abramson et al. |
| 8,370,985 | B2 * | 2/2013 | Schnittman ........... A47L 9/2805 15/41.1 |
| 2002/0174506 | A1 * | 11/2002 | Wallach ................ A47L 9/009 15/319 |
| 2005/0065662 | A1 | 3/2005 | Reindle et al. |
| 2005/0166355 | A1 | 8/2005 | Tani |
| 2005/0204505 | A1 | 9/2005 | Kashiwagi |
| 2006/0260090 | A1 | 11/2006 | Kim |
| 2007/0032904 | A1 * | 2/2007 | Kawagoe ............. G05D 1/0227 701/23 |
| 2013/0331990 | A1 * | 12/2013 | Jeong .................. A47L 11/4061 700/259 |

(Continued)

*Primary Examiner* — Thomas Raymond Rodgers
(74) *Attorney, Agent, or Firm* — Quinn IP Law

(57) ABSTRACT

An autonomous vacuum cleaner includes an autonomously moveable housing carrying a vacuum collection system for generating a working air flow for removing dirt from the surface to be cleaned and storing the dirt in a collection space. Distance sensors for position sensing are mounted to the housing, behind a sensor cover. The distance sensors can be staggered and/or positioned above a brush chamber for a brushroll.

19 Claims, 22 Drawing Sheets

(56) References Cited

U.S. PATENT DOCUMENTS

2014/0188325 A1 7/2014 Johnson et al.
2016/0073839 A1 3/2016 Janzen et al.
2017/0100007 A1 4/2017 Matsumoto et al.

* cited by examiner

AUTONOMOUS VACUUM CLEANER

CROSS-REFERENCE TO RELATED APPLICATION(S)

This application is a divisional of U.S. patent application Ser. No. 15/705,781, filed Sep. 15, 2017, now issued as U.S. Pat. No. 10,595,694, issued Mar. 24, 2020, which claims the benefit of U.S. Provisional Patent Application No. 62/395,674, filed Sep. 16, 2016, which are incorporated herein by reference in their entirety.

BACKGROUND

Autonomous or robotic floor cleaners can move without the assistance of a user or operator in order to clean a floor surface. For example, the floor cleaner can be configured to sweep dirt (including dust, hair, and other debris) into a collection bin carried on the floor cleaner and/or to sweep dirt using a cloth which collects the dirt. The floor cleaner can move randomly about a surface while cleaning the floor surface or use a mapping/navigation system for guided navigation about the surface.

BRIEF DESCRIPTION

An aspect of the disclosure relates to an autonomous vacuum cleaner, comprising an autonomously moveable housing having a front, a rear, a first side, and a second side, a vacuum collection system carried by the autonomously moveable housing, a plurality of distance sensors carried by the autonomously moveable housing, and a sensor cover covering the plurality of distance sensors wherein the plurality of distance sensors are staggered relative to the front of the autonomously moveable housing.

DETAILED DESCRIPTION

Aspects of the present disclosure relate to autonomous or robotic vacuum cleaners. In one of its aspects, the disclosure relates to improved distance sensing for an autonomous vacuum cleaner. In another aspect, the disclosure relates to an improved brush chamber for an autonomous vacuum cleaner. In another aspect, the disclosure relates to an improved bumper for an autonomous vacuum cleaner. In another aspect, the disclosure relates to an improved drive system for an autonomous vacuum cleaner. In another aspect, the disclosure relates to methods of manufacturing a decorative plastic component for an autonomous vacuum cleaner.

Figure 1:
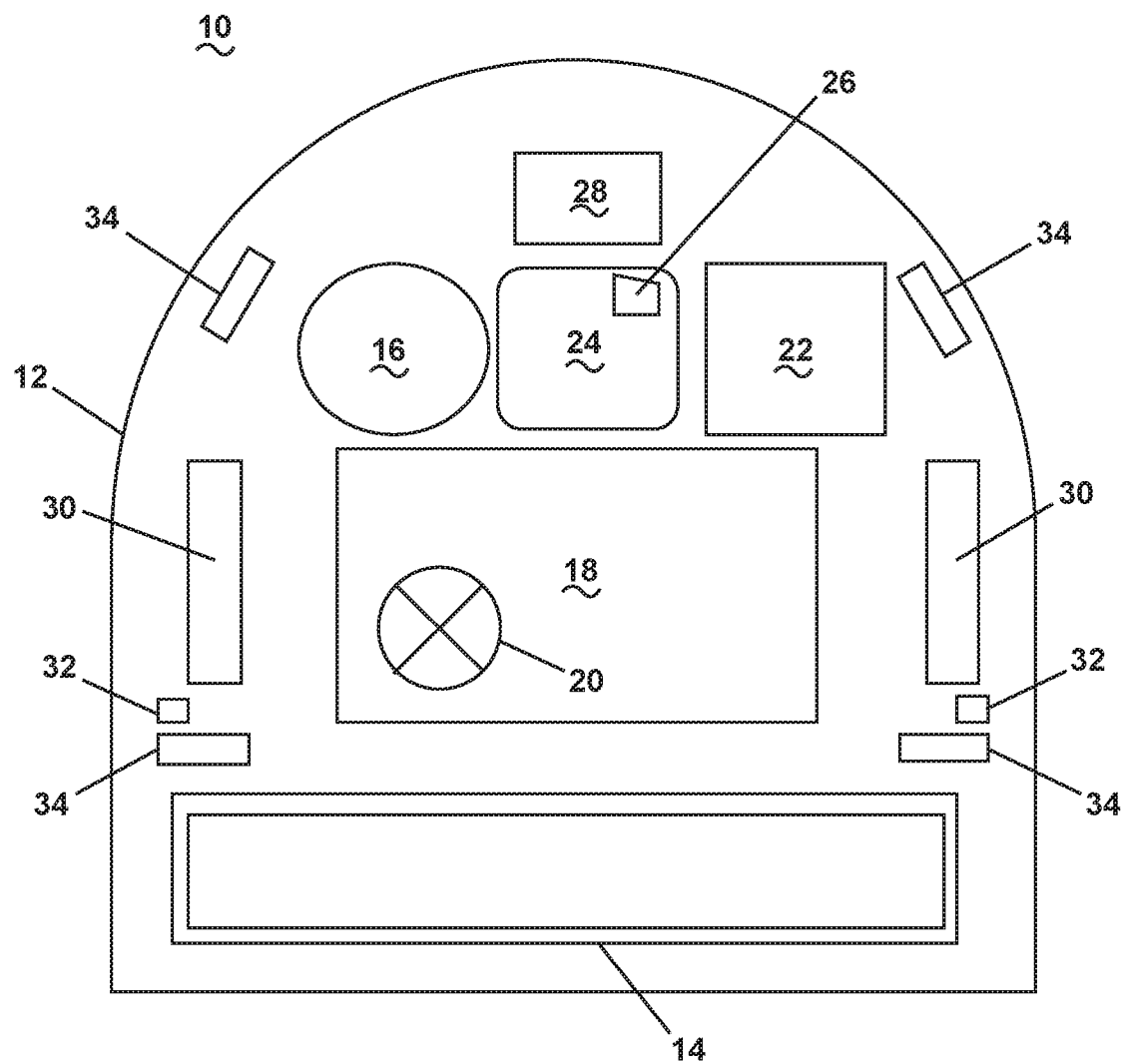
FIG. 1 is a schematic view of an autonomous vacuum cleaner according to aspects of the present disclosure.

FIG. 1 is a schematic view of an autonomous vacuum cleaner 10. The autonomous vacuum cleaner 10 has been illustrated as a robotic vacuum cleaner that mounts the components various functional systems of the vacuum cleaner in an autonomously moveable unit or housing 12, including components of a vacuum collection system for generating a working air flow for removing dirt (including dust, hair, and other debris) from the surface to be cleaned and storing the dirt in a collection space on the vacuum cleaner, and a drive system for autonomously moving the vacuum cleaner over the surface to be cleaned. While not illustrated, the autonomous floor cleaner 10 could be provided with additional functional systems, such as a navigation system for guiding the movement of the vacuum cleaner over the surface to be cleaned, a mapping system for generating and storing maps of the surface to be cleaned and recording status or other environmental variable information, and/or a dispensing system for applying a treating agent stored on the vacuum cleaner to the surface to be cleaned.

The vacuum collection system can include a working air path through the unit having an air inlet and an air outlet, a suction nozzle 14, a suction source 16 in fluid communication with the suction nozzle 14 for generating a working air stream, and a dirt bin 18 for collecting dirt from the working airstream for later disposal. The suction nozzle 14 can define the air inlet of the working air path. The suction source 16 can be a motor/fan assembly carried by the unit 12, fluidly upstream of the air outlet, and can define a portion of the working air path. The dirt bin 18 can also define a portion of the working air path, and comprise a dirt bin inlet in fluid communication with the air inlet. A separator 20 can be formed in a portion of the dirt bin 18 for separating fluid and entrained dirt from the working airstream. Some non-limiting examples of the separator include a cyclone separator, a filter screen, a foam filter, a HEPA filter, a filter bag, or combinations thereof.

The suction source 16 can be electrically coupled to a power source 22, such as a rechargeable battery. In one example, the battery can be a lithium ion battery. Charging contacts for the rechargeable battery can be provided on the exterior of the main housing. A docking station (not shown) for receiving the unit for charging can be provided with corresponding charging contacts. A user interface 24 having at least a suction power switch 26 between the suction source 16 and the power source 22 can be selectively closed by the user, thereby activating the suction source.

A controller 28 is operably coupled with the various function systems of the autonomous vacuum cleaner 10 for controlling its operation. The controller 28 is operably coupled with the user interface 24 for receiving inputs from a user. The controller 28 can further be operably coupled with various sensors 32, 34, 56, 108 for receiving input about the environment and can use the sensor input to control the operation of the autonomous vacuum cleaner 10.

The controller 28 can, for example, be operably coupled with the drive system for directing the autonomous movement of the vacuum cleaner over the surface to be cleaned. The drive system can include drive wheels 30 for driving the unit across a surface to be cleaned. The sensors 32, 34 and drive system are described in more detail below.

Figure 2:
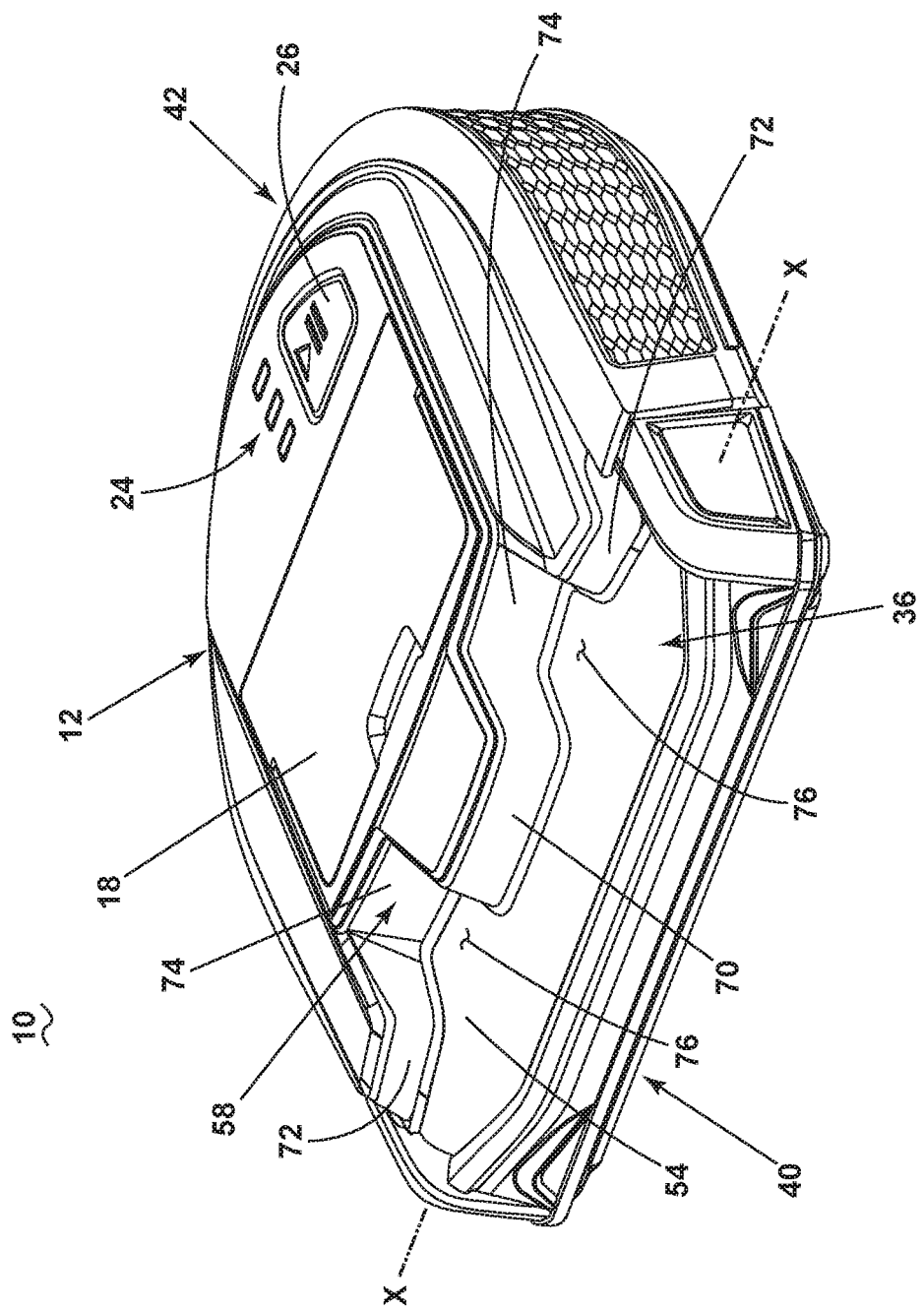
FIG. 2 is a perspective view of an example of the autonomous vacuum cleaner of FIG. 1.
Figure 3:
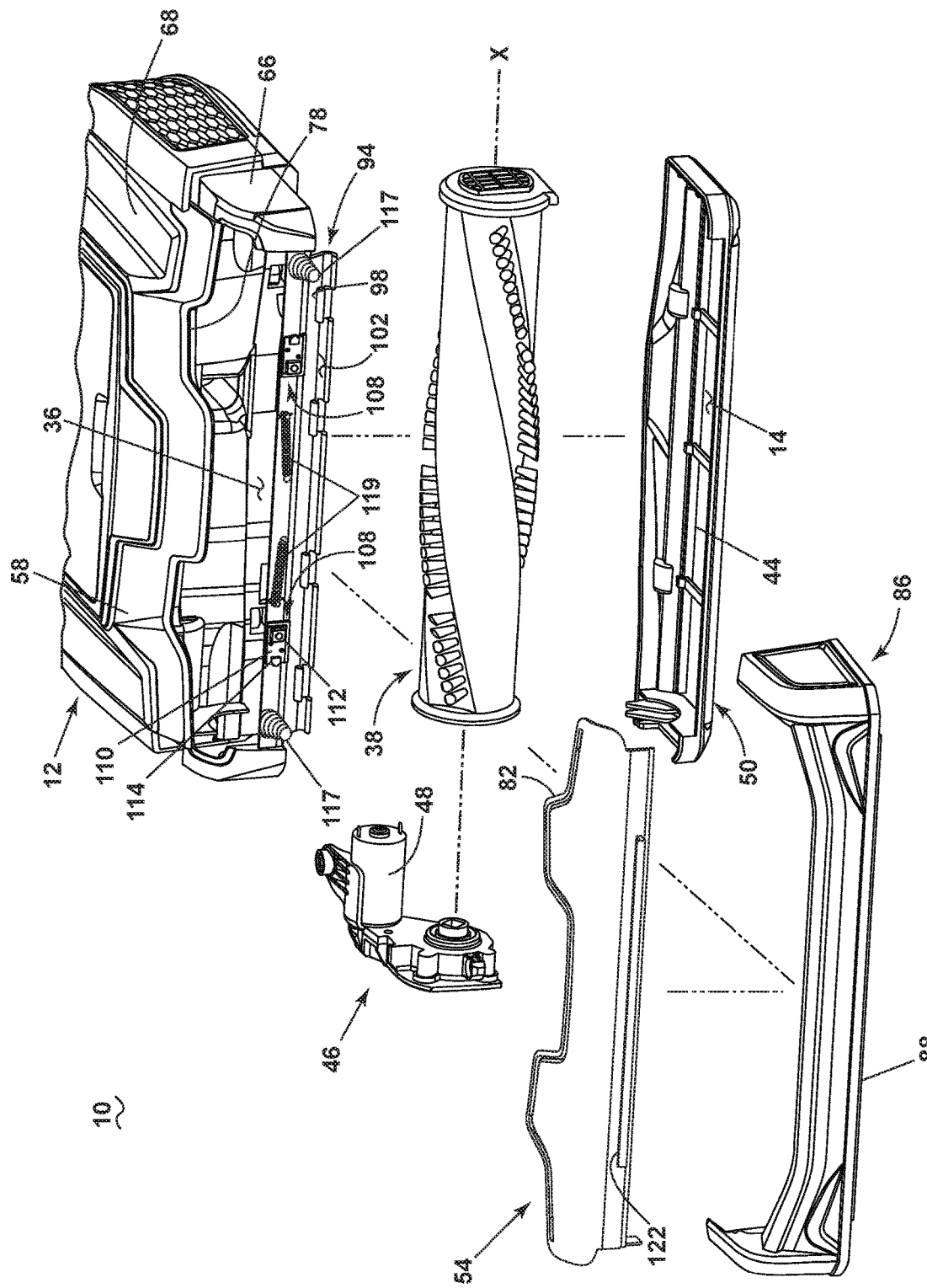
FIG. 3 is a partially exploded view of the autonomous vacuum cleaner of FIG. 2 showing components of an agitation system and brush chamber.

With reference to FIGS. 2-3, the autonomous vacuum cleaner 10 can include a brush chamber 36 at a front of the autonomous unit 12 in which an agitator such as a brushroll 38 is mounted. As used herein, "front" or "forward" and variations thereof are defined relative to the direction of forward travel of the autonomous vacuum cleaner 10, unless otherwise specified. The brushroll 38 is mounted for rotation about a substantially horizontal axis X, relative to the surface over which the unit 12 moves. A sole plate 50 can at least partially retain the brushroll in the brush chamber 36, and has an inlet opening defining the suction nozzle 14. A wiper blade 44 can be provided adjacent a trailing edge of the suction nozzle 14, behind the brushroll 38 in order to aid in dust collection. The wiper blade 44 is an elongated blade that generally spans the width of the suction nozzle 14, and can be supported by the sole plate 50.

In the present example, the brushroll 38 is mounted at the front of the vacuum cleaner 10, whereas brushrolls on most autonomous vacuum cleaners are mounted near middle of housing and hidden under an opaque plastic housing. The housing 12 of the illustrated vacuum cleaner 10 can be configured to accommodate the brushroll 38 in the forward location, such as by having an overall "D-shape" when viewed from above, with the housing 12 having a straight front edge 40 and a rounded rear edge 42.

An agitator drive assembly 46 including a separate, dedicated agitator drive motor 48 can be provided within the unit 12 to drive the brushroll 38 and can include a drive belt (not shown) that operably connects a motor shaft of the agitator drive motor 48 with the brushroll 38 for transmitting rotational motion of the motor shaft to the brushroll 38. Alternatively, the brushroll 38 can be driven by the suction source 16.

Due to the D-shaped housing 12 and position of the brushroll 38 at the front of the housing 12, the brushroll 38 can be larger than brushrolls found on conventional autonomous vacuum cleaners. In one example, the brushroll 38 can be a "full-size" brushroll that is typically found an upright vacuum cleaner. The brushroll 38 can also be removable from the unit 12 for cleaning and/or replacement.

In one example, the brushroll 38 can have a diameter that is approximately 8× larger and a length that is approximately 2× larger than for a brushroll found in conventional autonomous vacuum cleaners. In one specific example, the brushroll 38 can have a diameter of 48 mm and a length of 260.5 mm.

The autonomous vacuum cleaner 10 further includes a transparent brushroll window 54 at a front of the unit 12. The brushroll window 54 defines a portion of the brush chamber 36 in which the brushroll 38 is mounted. As such, the brushroll 38 is visible through the transparent portion of the window 54. The brushroll window 54 can be made from a clear or colored transparent material, such as polymethlamethacrylate.

Figure 4:
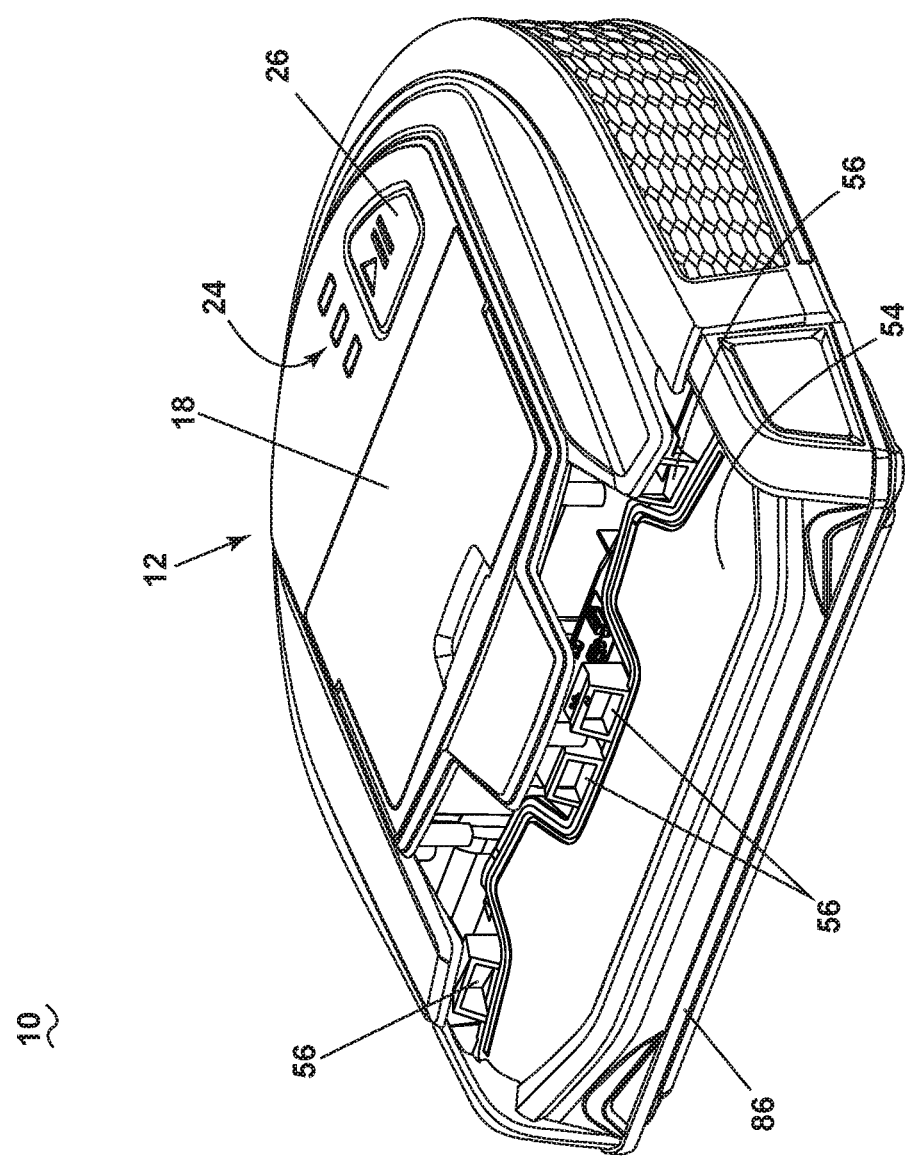
FIG. 4 is a perspective view of the autonomous vacuum cleaner of FIG. 2, with a sensor cover removed for clarity to show distance sensors for position sensing.
Figure 5:
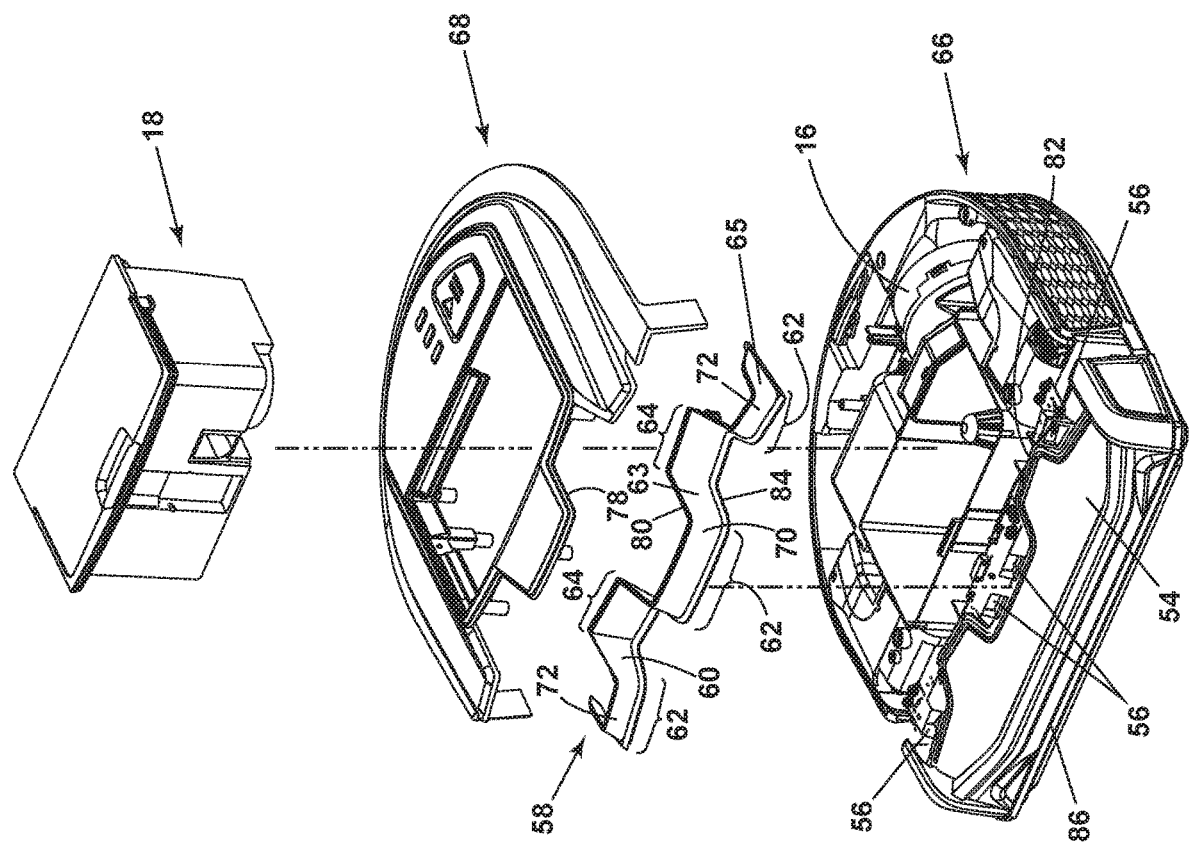
FIG. 5 is a partially exploded view of the autonomous vacuum cleaner of FIG. 2.
Figure 6:
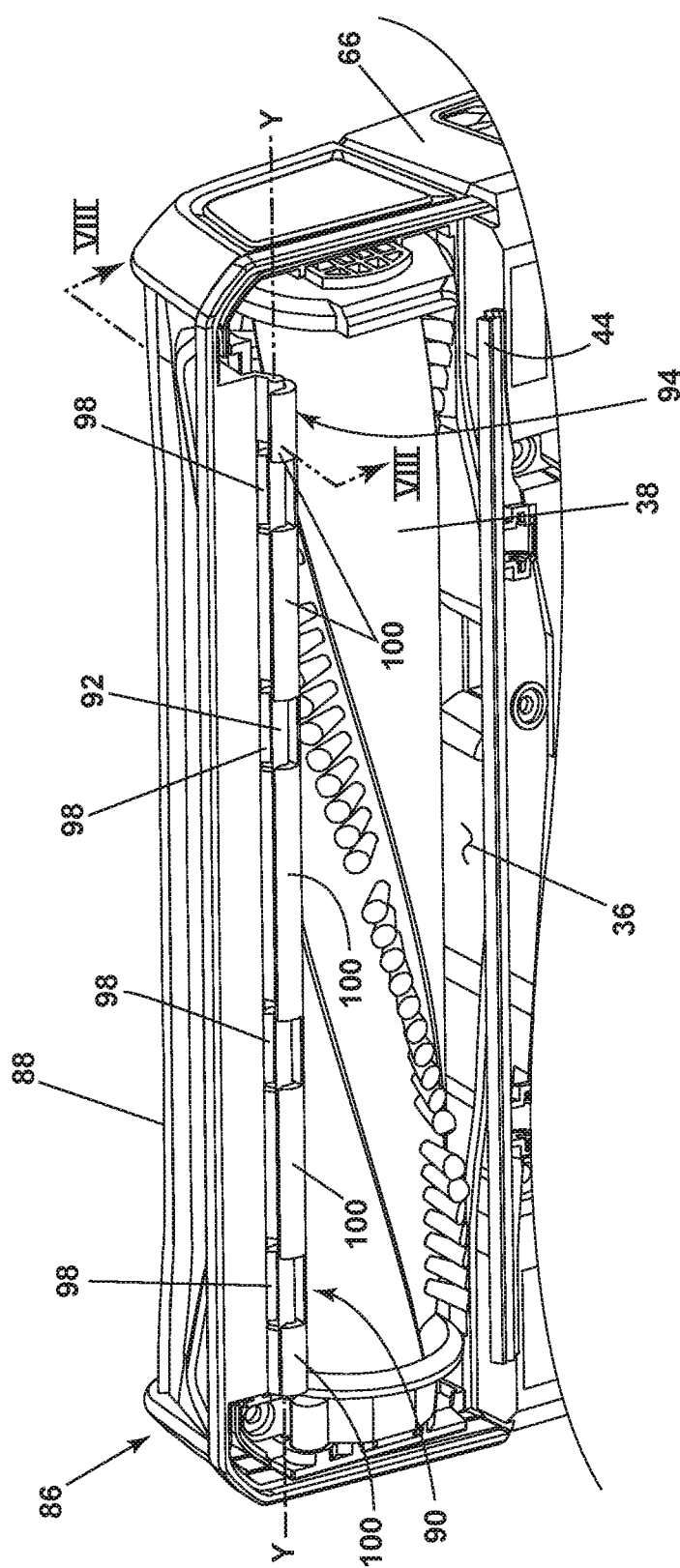
FIG. 6 is a bottom perspective view of a front of the autonomous vacuum cleaner of FIG. 2, with a sole plate removed for clarity to show a bumper assembly.
Figure 7:
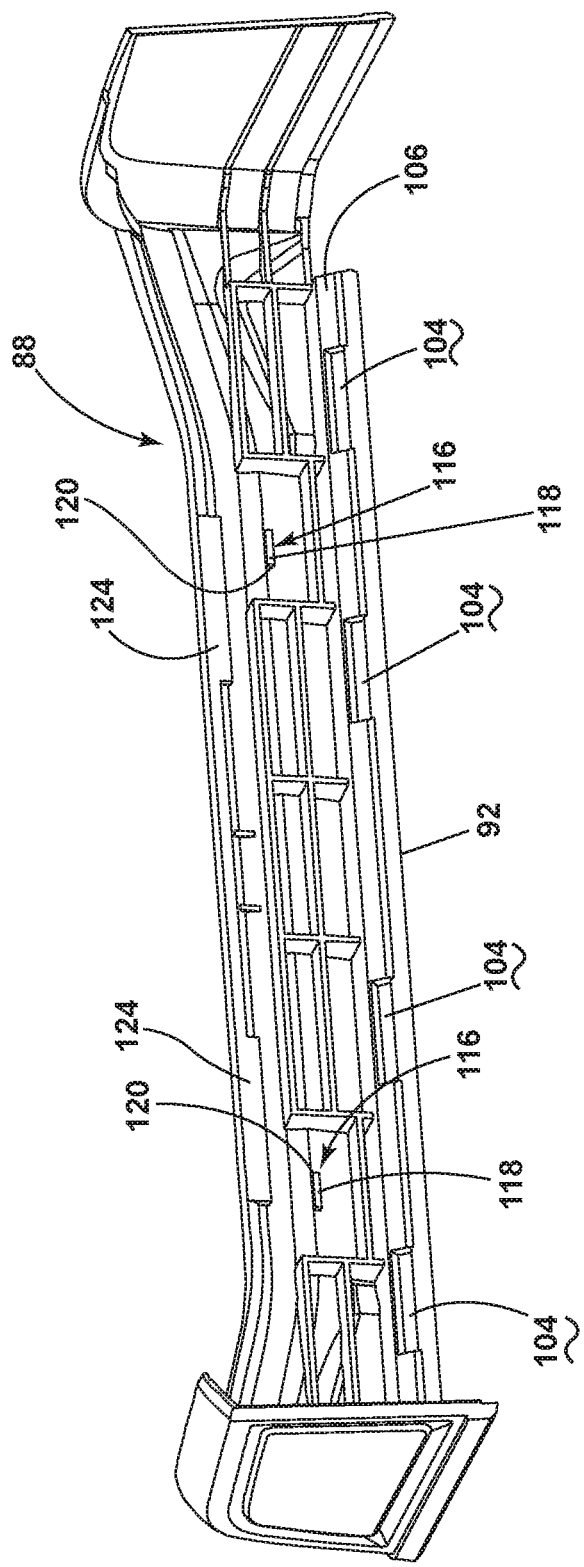
FIG. 7 is a rear view of a bumper of the bumper assembly of FIG. 6.

With reference to FIGS. 4-5, the autonomous vacuum cleaner 10 can include multiple distance sensors 56 for position sensing. The distance sensors 56 can be infrared sensors or time-of-flight sensors. The distance sensors 56 are mounted to the housing 12, above the brushroll window 54, and behind a transparent or translucent portion of the housing 12. For example, the housing 12 can comprise a transparent or translucent sensor cover 58 for covering and protecting the sensors 56, while also admitting at least some IR light or other light signal, depending on sensor type, to pass through. It is noted that in FIG. 4, the sensor cover 58 is removed to show the sensors 56.

The sensor cover 58 can be set back relative to the front edge 40 of the housing 12 to expose at least a portion of the brush chamber 36, and therefore the brushroll 38 through the brushroll window 54. The sensor cover 58 can be a transparent or translucent material configured to filter out daylight and protect LEDs of the sensors 56. A highly polished surface finish may be preferred. The sensor cover 58 may be plastic for durability, such as polycarbonate.

In one example, four front-facing distance sensors 56 for position sensing are provided. Each sensor 56 has a pulsed emitted light signal and a linear imager for determining more precise distance to objects. Input from the distance sensors 56 is used by the controller 28 to slow down and/or adjust the course of the unit 12 when objects are detected by the sensors 56.

Each sensor 56 has a field of view, or sensing zone. At least the two outboard sensors 56 can be angled inwardly, to provide overlapping fields of views. Such a field of view allows the sensors 56 to detect obstacles towards the front and sides of the autonomous vacuum cleaner 10.

The sensor cover 58 comprises an undulating, approximately vertical wall 60 spanning the approximate width of the autonomous unit 12, i.e. the distance along the straight front edge 40. The sensor cover 58 is staggered between multiple forward and rearward wall sections 62, 64 that are captured between a main housing 66 of the unit 12 and a top cover 68. The staggered forward and rearward wall sections 62, 62 can be joined by intermediate wall sections 63. The outboard ends of the forward wall sections 62 can have end cap sections 65 which enclose the end of the sensor cover 58. By being "approximately vertical", sections 62, 63, 64, 65 of the cover wall 60 may be vertical with respect to the surface to be cleaned, or may be slightly angled, such as by being up to 10 degrees off from vertical.

The forward wall sections 62 of the sensor cover 58 form a central cover portion 70 and a side cover portion 72 on each end of the unit 12, which are located above the brushroll 38 and substantially aligned with a vertical plane passing through the axis X of the brushroll 38. The distance sensors 56 are mounted directly behind the central and side cover portions 70, 72.

With additional reference to FIGS. 2, the rearward wall sections 64 of the sensor cover 58 form indentations 74 between the central and side cover portions 70, 72 define recesses 76 in the top cover 68 that expose a larger portion of the brushroll window 54 and increase visibility of the brushroll 38 and brush chamber 36.

It is noted that the top cover 68 can have an undulating edge 78 having a staggered profile with multiple forward and rearward sections that correspond to the shape of an upper edge 80 of the sensor cover 58. Likewise, the brushroll window 54 can have an undulating edge 82 having a staggered profile with multiple forward and rearward sections that correspond to the shape of a lower edge 84 of the sensor cover 58. The undulating edge 78 of the top cover 68 can be disposed at the front of the top cover 68, and the undulating edge 82 of the brushroll window 54 can be disposed at a rear and upper portion of the brushroll window 54. This positions the sensor cover 58 between the top cover 68 and the brushroll window 54.

Most robot cleaners have sensors that are mounted on the front wall of the main housing, in front of the brushroll. However, the benefit of mounting sensors 56 off the front wall and above brush chamber 36, as shown in the present example, is that the brushroll 38 can be positioned closer to the front edge 40 of the unit 12, which provides better cleaning coverage, and makes the brushroll 38 more visible.

The undulating sensor cover 58 allows the distance sensors 56 to be positioned above the brushroll 38, forwardly enough so that the brushroll 38 does not block the sensor field of view, while at the same time defining the recesses 76 adjacent to the central and side cover portions 70, 72 for maximizing visibility of the brushroll 38.

With reference to FIGS. 3, and 6-8, a bumper assembly 86 can be provided at the front of the unit 12, and may extend across a front portion of the brush chamber 36 and/or brushroll window 54. The bumper assembly 86 is adapted for a dual-direction movement for sensing obstacles in front of and on the sides of the autonomous vacuum cleaner 10. The bumper assembly 86 is configured to pivot about an axis Y in response to front impacts, i.e. when the vacuum cleaner 10 strikes or collides with an object somewhere along the front of the vacuum cleaner 10. The bumper assembly 86 is also configured to slide transversely along the axis Y in response to side impacts, i.e. when the vacuum cleaner 10 strikes or collides with an object somewhere along one of the sides of the vacuum cleaner 10.

The bumper assembly 86 can include a three-sided bumper 88 disposed along the entire front edge 40 of the housing 12, in particular the main housing 66, and partially along two opposing sides of the housing 12, in particular opposing forward sides of the main housing 66. The bumper assembly 86 further includes a coupling joint 90 mounting the bumper 88 to the housing 12 for dual-direction movement about and along the axis Y. The coupling joint 90 can be a cylindrical joint with two degrees of freedom, and allows the bumper 88 to rotate about and translate along the axis Y. The bumper 88 comprises a moving body of the cylindrical joint 90, while a fixed body of the cylindrical joint 90 is provided on the housing 12.

The cylindrical joint 90 shown includes an elongated cylindrical pin or rod 92 on the rear of the bumper 88 which is received in a sleeve 94 provided on the housing 12, and in the illustrated example, provided on the lower front portion of the main housing 66. Clearance is provided between the rod 92 and the sleeve 94 to provide the rod 92 with the freedom to rotate and translate within the sleeve 94. The rod 92 defines and is centered along the axis Y of the cylindrical joint 90.

The cylindrical joint 90 can be configured for a snap-fit between the rod 92 and the sleeve 94. The sleeve 94 can have a partially-open configuration configured to resiliently snap onto the rod 92, and as shown can be defined by at least one bumper mount on the lower front portion of the main housing 66. As illustrated, multiple spaced bumper mounts are provided, and collectively define the sleeve 94. The bumper mounts comprise opposing curved fingers 98, 100 extending transversely across the lower front portion of the main housing 66. The fingers are arranged as alternating lower and upper fingers 98, 100, respectively that wrap around the rod 92 to capture the rod 92 in a socket 102 defined by the sleeve 94.

The cylindrical joint 90 shown further includes at least one slot 104 on the bumper 88, above and adjacent to the rod 92, which receive the upper fingers 98 of the sleeve 94. As illustrated, multiple spaced slots 104 are provided in a bumper arm 106 extending rearwardly and downwardly from the bumper 88 to support the rod 92. The slots 104 can be elongated relative to the upper fingers 98, with the width of the slots 104 being greater than the width of the upper fingers 98, which permits the bumper 88 to slide transversely along the axis Y in response to side impacts.

The bumper assembly 86 interacts with bump sensors 108 for determining front or side impacts to the bumper 88. Two bump sensors 108 in the form of bumper switch modules are mounted to opposite ends of a front wall of the brush chamber 36, behind the bumper 88. Each switch module comprises a printed circuit board (PCB) 110 with a front-actuated bump switch 112 and an outboard side-actuated bump switch 114. The bumper 88 includes sensor actuators 116 for actuating the appropriate switch 112, 114 depending on the impact type. The sensor actuators 116 shown include ribs on the backside of the bumper 88 with a front impact actuation surface 118 and a side impact actuation surface 120 that are configured to engage the front and side bump switches 112, 114, respectively, depending on the location and/or direction of the impact. The PCBs 110 provided at a front side of the unit 12 are actuated with the separate bump switches 112, 114 for discerning front or side impacts to the bumper assembly 86. Output signals from the PCBs 110 provide inputs to the controller 28 for selecting an obstacle avoidance algorithm.

It is noted that one or more forward return springs 117 can be provided between the front wall of the brush chamber 36 and the rear of the bumper 88 to bias the bumper 88 forwardly away from the bump sensors 108, so that after a front impact force is removed, the bumper 88 will return to its original position in which the sensor actuators 116 are spaced from the bump sensors 108. Additionally, one or more lateral return springs 119 can be provided between the front wall of the brush chamber 36 and the rear of the bumper 88 to bias the bumper 88 toward the center so that after a side impact force is removed, the bumper 88 will return to its original position in which the sensor actuators 116 are spaced from the bump sensors 108.

In addition to the cylindrical joint 90, the bumper assembly 86 can be mounted to the housing 12 at another location. The second mounting location can be spaced from the cylindrical joint 90 to provide a stable connection between the bumper assembly 86 and the housing 12, and can further be configured to allow the dual-direction movement of the bumper assembly 86. In the illustrated example, the second mounting includes at least one rail 122 provided on the front of the brush chamber 36 above the bump sensors 108, such as on the brushroll window 54. The second mounting further includes at least one hanger 124 on the rear of the bumper 88 that is received by the rail 122. The rail 122 and hanger 124 have a front-to-back clearance therebetween permitting the bumper 88 to move in response to front impacts. Optionally, the bottom of the hanger 124 can contact the top of the rail 122 in sliding relation such that the hanger 124 can slide in dual-directions relative to the rail 122 during front and side impacts.

Figure 8:
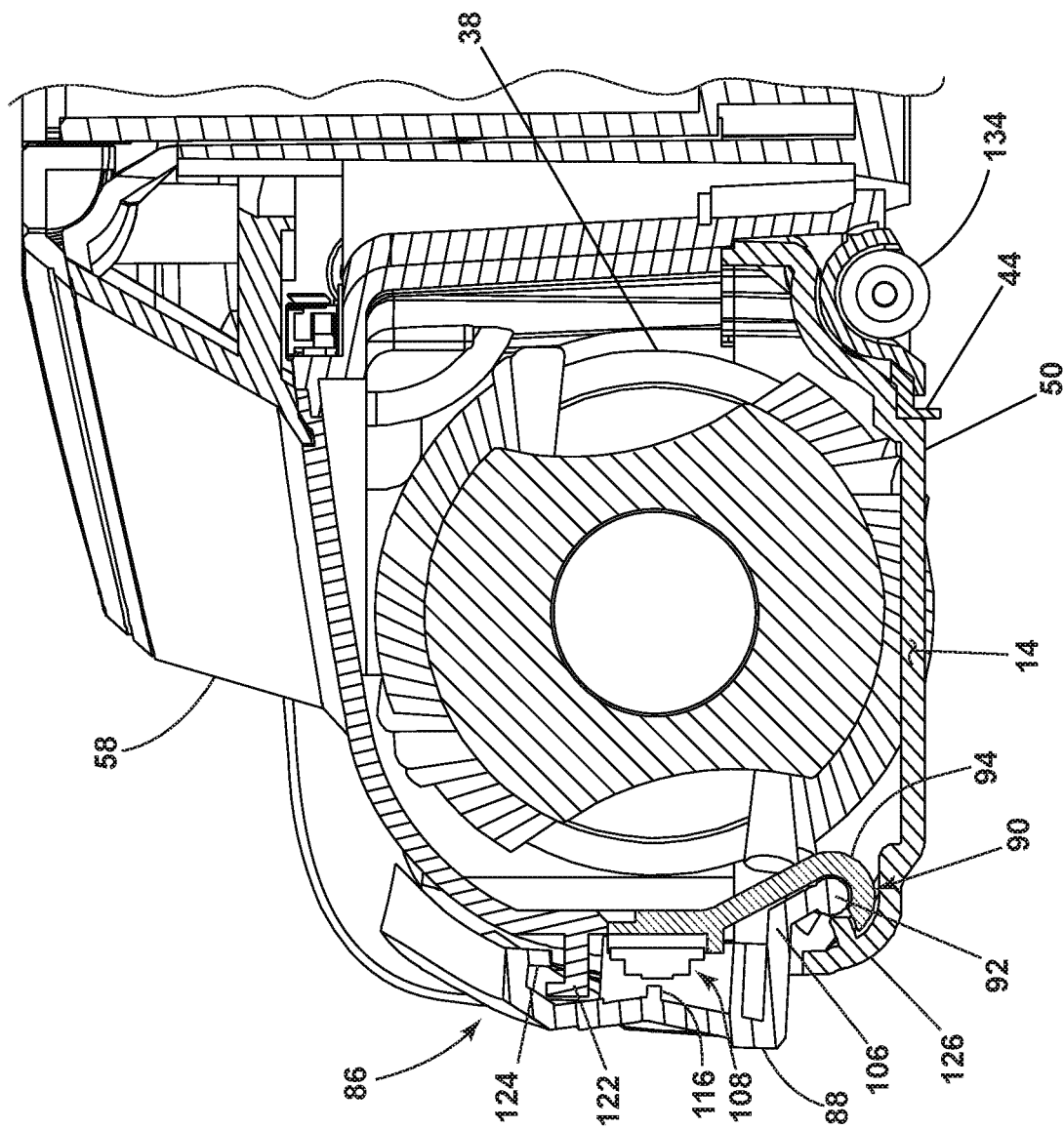
FIG. 8 is a section view through line VIII-VIII from FIG. 6.

With reference to FIG. 8, optionally, a portion of the sole plate 50 can cover the cylindrical joint 90 to protect the cylindrical joint 90 from direct impacts. As shown, a leading end of the sole plate 50, adjacent a leading edge of the suction nozzle 14, can comprise a curved wall forming a joint cover 126. The joint cover 126 extends over the pivot joint 90, but is recessed with respect to the bumper 88 and has a clearance therewith so as to not interrupt the dual-action movement of the bumper assembly 86.

It is noted that, in the example illustrated herein, the dual-action bumper assembly 86 is separate from the brushroll window 54. In an alternative example, the dual-action bumper assembly 86 can be combined with brushroll window 54.

Figure 9:
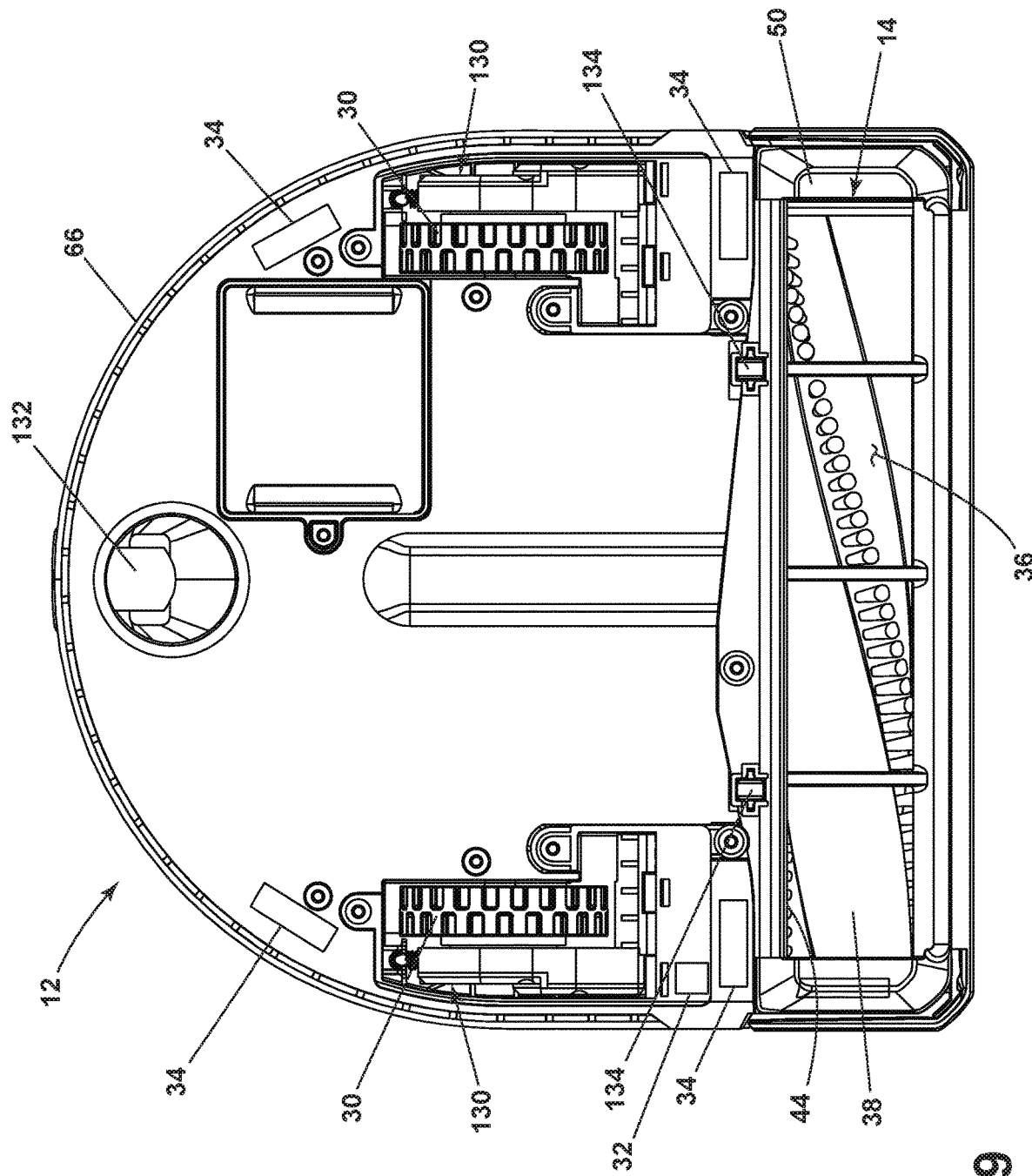
FIG. 9 is a bottom view of the autonomous vacuum cleaner of FIG. 2 showing a portion of a drive system.

With reference to FIG. 9, in addition to the distance sensors 56 and the bump sensors 108, the autonomous vacuum cleaner 10 can optionally include additional sensors, including one more wall following sensors 32, one or more cliff sensors 34, and/or one or more inertial sensors (not shown). In the illustrated example, the wall following sensor 32 is located near one side of the main housing 66, behind the brush chamber 36, and can include a side-facing optical position sensor that provides distance feedback and controls the vacuum cleaner 10 so that the unit 12 can follow near a wall without contacting the wall. The cliff sensors 34 can include four bottom-facing optical position sensors that provide distance feedback and controls the vacuum cleaner 10 so that the unit 12 can avoid excessive drops such as stairwells or ledges. Two of the cliff sensors 34 are provided in the front corners of the unit 12, immediately behind the brushroll 38, and the other two cliff sensors 34 are provided in the back corners of the unit 12, behind the drive wheels 30. In addition to optical sensors, the wall following and cliff sensors 32, 34 can be mechanical or ultrasonic sensors and, in all cases, the sensors can be mounted in alternative positions, such as in front of or alongside the brushroll, for example.

The inertial sensor (not shown) can be an integrated sensor located on the controller 28, which may include a PCB assembly and can be a nine-axis gyroscope or accelerometer to sense linear, rotational and magnetic field acceleration. The integrated inertial sensor can use acceleration input data to calculate and communicate change in velocity and pose to the controller 28 for navigating the vacuum cleaner 10 around the surface to be cleaned.

An artificial barrier system (not shown) can be provided with the autonomous vacuum cleaner 10 for containing the vacuum cleaner 10 within a user-determined boundary. An artificial barrier generator comprises a housing with at least one sonic receiver for sensing normal operational sound emitted by the autonomous vacuum cleaner 10 and at least one IR transmitter for emitting an encoded IR beam towards a predetermined direction for a predetermined period of time. The artificial barrier generator can be battery powered by rechargeable or non-rechargeable batteries. In one example, the sonic receiver can comprise a microphone configured to sense a predetermined threshold sound level, which corresponds with the sound level emitted by the autonomous vacuum cleaner 10 when it is within a predetermined distance away from the artificial barrier generator. Optionally, the artificial barrier generator can further comprise a plurality of IR emitters near the base of the housing configured to emit a plurality of short field IR beams around the base of the artificial barrier generator housing. The artificial barrier generator can be configured to selectively emit one or more IR beams for a predetermined period of time, but only after the microphone senses the threshold sound level, which indicates the autonomous cleaner is nearby. Thus, the artificial barrier generator is able to conserve power by emitting IR beams only when the autonomous cleaner is in the vicinity of the artificial barrier generator.

A plurality of IR receivers (not shown) around the perimeter of the vacuum cleaner 10 sense the IR signals emitted from the artificial barrier generator and output corresponding signals to the controller 28, which can adjust drive wheel control parameters to adjust the position of the vacuum cleaner 10 to avoid the boundaries established by the artificial barrier encoded IR beam and the short field IR beams. This prevents the autonomous vacuum cleaner 10 from crossing the artificial barrier boundary and/or colliding with the artificial barrier generator housing.

In operation, sound emitted from the autonomous vacuum cleaner 10 greater than a predetermined threshold sound level is sensed by the microphone and triggers the artificial barrier generator to emit one or more IR beams as described previously for a predetermined period of time. The IR receivers on the autonomous vacuum cleaner 10 sense the IR beams and output signals to the controller 28, which then manipulates the drive system to adjust the position of the vacuum cleaner 10 to avoid the border established by the artificial barrier system while continuing to perform a cleaning operation on the surface to be cleaned.

With reference to FIGS. 9-12, the autonomous vacuum cleaner 10 can include a drive system for driving the unit 12 across a surface to be cleaned. The drive system can include a left and right drive wheel module assembly 130, each associated with a left and right side of the unit 12. As shown in FIG. 8, the drive wheel module assemblies 130 are located rearwardly of the brushroll 38. In addition to the drive wheel module assemblies 130, the autonomous vacuum cleaner 10 can include a castor wheel 132 at a center, rear portion of the unit 12, and wheels 134 on the sole plate 50 adjacent a rear edge of the opening defining the suction nozzle 14.

Figure 10:
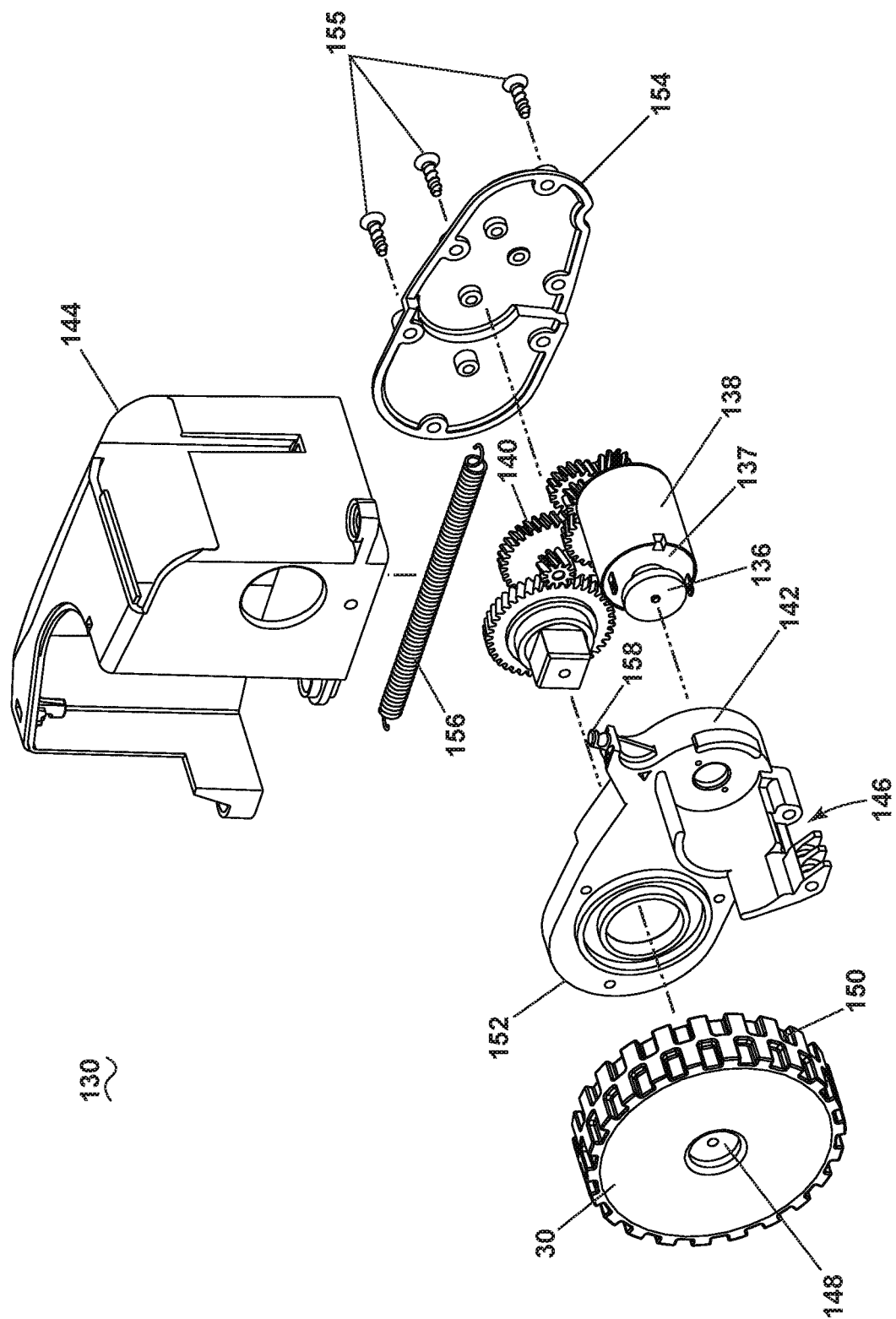
FIG. 10 is an exploded view of a drive wheel module assembly of the drive system.
Figure 11:
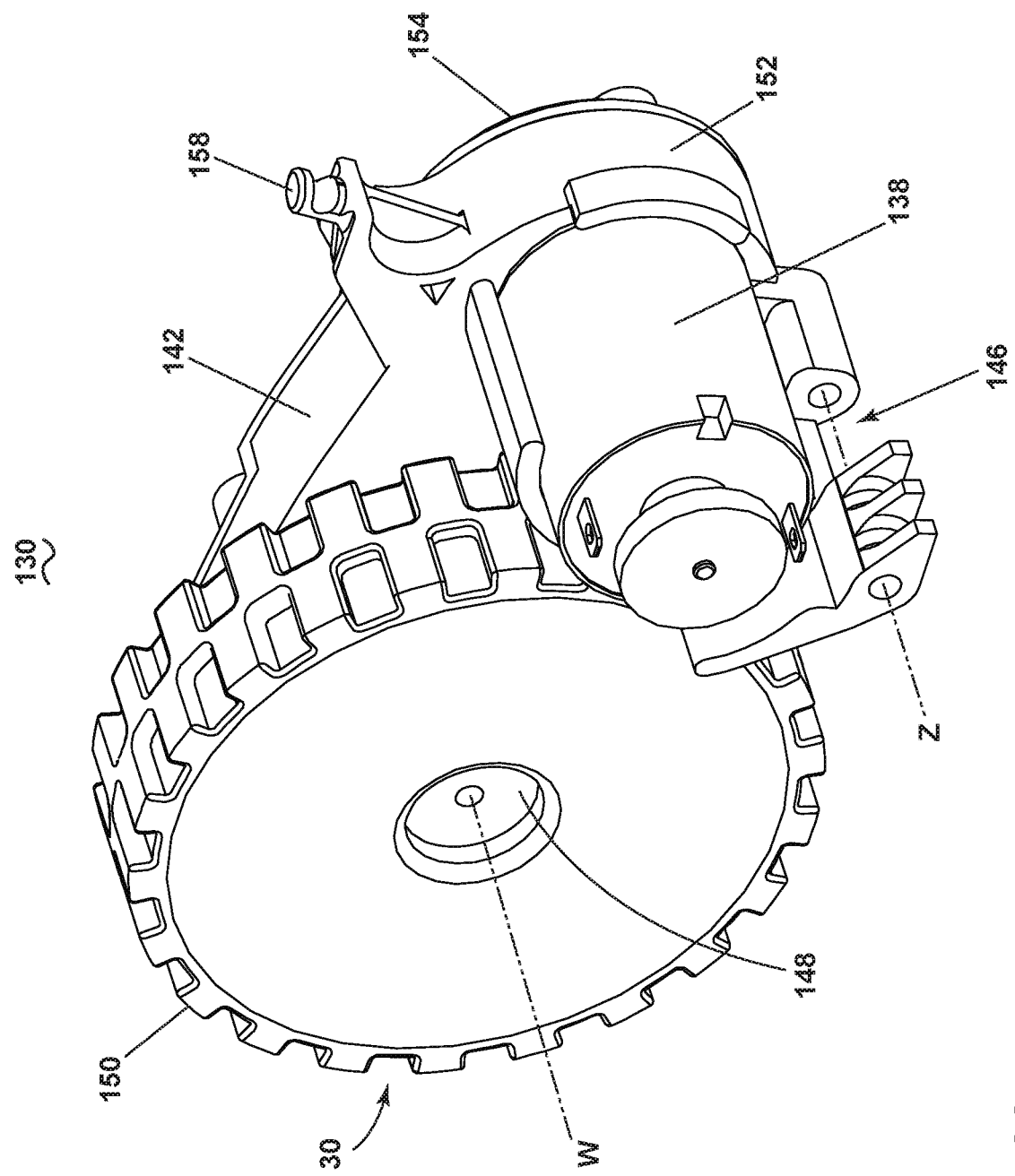
FIG. 11 is a perspective view of a drive wheel module of the assembly from FIG. 10.

Referring to FIGS. 10-11, the left drive wheel module assembly 130 is shown; the right drive wheel module assembly 130 can be substantially identical, with a mirror-image configuration, and is not shown in detail herein. The drive wheel module assembly 130 includes drive wheel 30, a drive motor 138, and a gear train 140, all of which are mounted on a pivot arm 142 and which is assembled within a wheel module housing 144, which is fixed within the housing 12 of the vacuum cleaner 10. The pivot arm 142 is pivotally mounted within the wheel module housing 144 by a pivot joint 146, and rotates about a pivot axis Z that is located forwardly of the drive wheel 136 (in the direction of forward travel). Thus, the drive wheel 30, drive motor 138 and gear train 140 pivot as one along with the pivot arm 142, relative to the wheel module housing 144 and to the housing 12.

The drive wheel 30 is drivably coupled to the drive motor 138 by the gear train 140. The drive motor 138 and gear train 140 can drive the drive wheel 30 in a forward or reverse direction in order to move the unit 12 forwardly or rearwardly. The gear train 140 can be any system of engaged gears that couple a drive shaft (not shown) of the drive motor 138 to a hub 148 of the drive wheel 30, which defines a rotation axis W of the wheel 30, to transmit the rotation of the drive shaft to the drive wheel 30. Alternatively, another type of drive coupling can be used, such as a belt coupled between the drive motor 138 and drive wheel 30. The drive wheel 30 can comprise a tread 150 on the periphery of the hub 148 to increase friction between the wheel 30 and the surface over which the autonomous vacuum cleaner 10 travels.

The drive motors 138 of the left and right drive wheel module assemblies 130 can be separately powered with a pulse-width modulation control. Magnetic wheel encoders 136 placed on the motor shaft and a printed circuit board (PCB) 137 with Hall Effect sensors are configured to measure the distance travelled.

The gear train 140 can be enclosed within a gear housing 152 formed by a portion of the pivot arm 142 and a cover 154. The cover 154 can be attached to the pivot arm 142 by screws 155, although other fasteners or other attachment methods can also be used.

Figure 12:
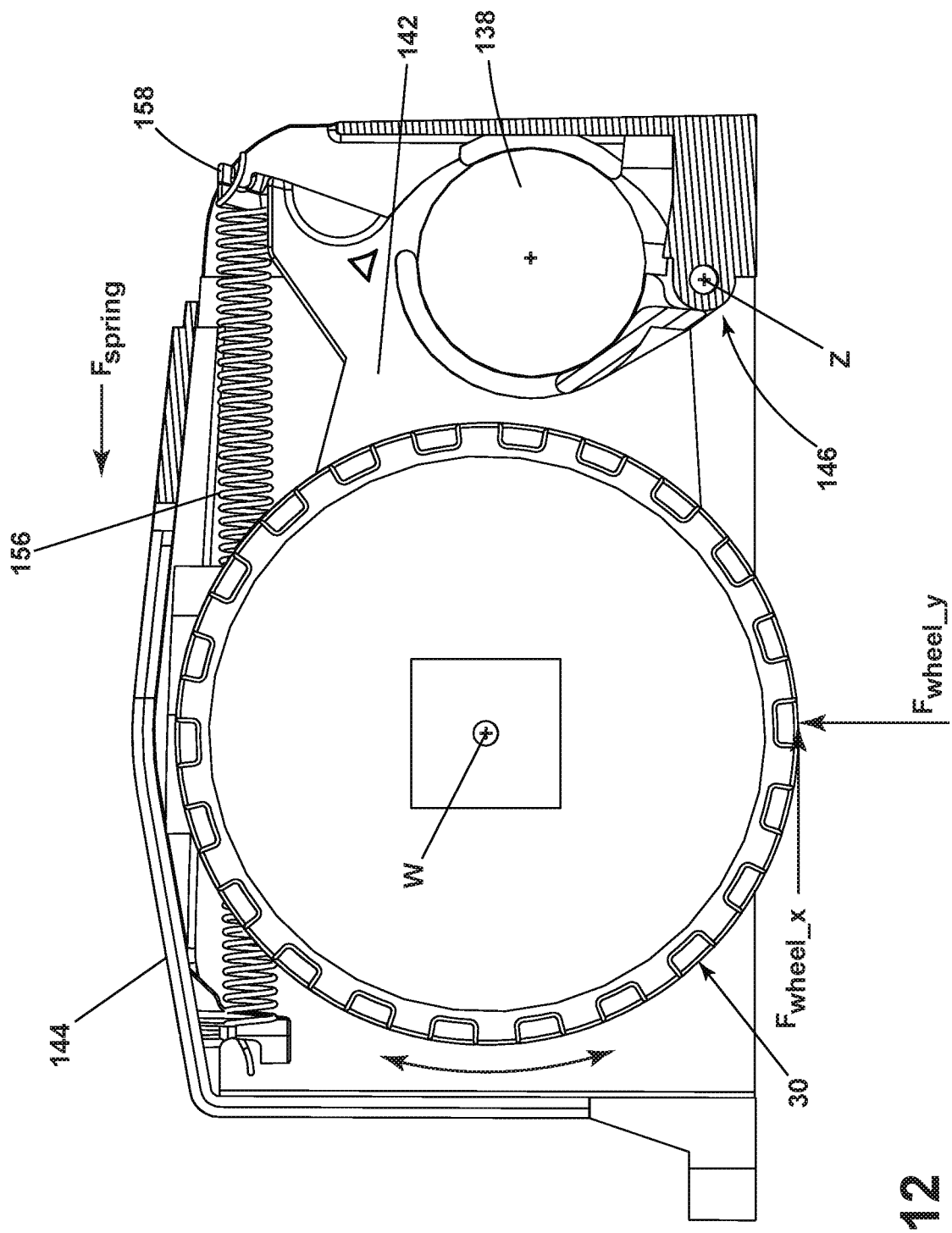
FIG. 12 is a sectional view through the drive wheel module assembly from FIG. 9.

Referring to FIGS. 10 and 12, the drive wheel module assembly 130 further includes a biasing mechanism for biasing the drive wheel 30 toward the surface to be cleaned. As shown herein, the biasing mechanism can include an extension spring 156. A movable end of the extension spring 156 is attached to a lever or lever arm 158 which extends from the pivot arm 142 above the pivot joint 146 between the pivot arm 142 and the module housing 144 that defines the pivot axis Z. The opposite end of the extension spring 156 is fixed to the wheel module housing 144, which is stationary or fixed within the housing 12 of the vacuum cleaner 10. Thus, the components of the drive wheel module assembly 130 are arranged so that the extension spring 156 applies force on the pivot arm 142, and therefore indirectly applies force on the drive wheel 30, and rotates the pivot arm 142 rearwardly about the pivot axis Z which forces the drive wheel 30 downwardly towards the surface to be cleaned so the drive wheel 30 engages the surface to be cleaned. In this manner, the drive wheel 30 can engage the surface to be cleaned to drive the vacuum cleaner 10 and can also automatically adjust to various contours of a floor surface, including different floor types like hard surfaces such as wood, tile, or linoleum, and soft surfaces such as carpets.

In the illustrated example, the pivot axis Z is located forwardly of the wheel axis W. Locating the pivot axis Z forwardly of the wheel axis W compared to a rearward pivot design reduces the magnitude of the spring force required from the extension spring 156 to ensure engagement between the drive wheel 30 and the surface to be cleaned. An extension spring 156 configured to apply a lesser spring force may be desirable because such an extension spring 156 is less substantial and less expensive. In other examples of the drive wheel module assembly 130, the pivot axis Z can be located rearwardly of the wheel axis W, with the extension spring 156 configured to apply a greater spring force.

With a forward pivot design, such as the illustrated example, the x-component of wheel force $F_{wheel\_x}$, i.e. the component of the wheel force parallel to the surface to be cleaned, imparts a counterclockwise moment about the pivot axis Z, which causes the drive wheel 30 to lower and engage the surface to be cleaned and compresses the spring 156.

Conversely, locating the pivot axis Z rearwardly of the drive wheel 30 can increase the spring force $F_{spring}$ required, which increases the cost and size of the spring 156 needed. In a rearward pivot design, the x-component of the wheel force $F_{wheel\_x}$ would impart a counterclockwise moment about the pivot axis Z, which would cause the drive wheel 30 to lift away from the surface being cleaned, counteracting the force $F_{spring}$ applied by the extension spring 156 to maintain engagement between the drive wheel 30 and the surface.

The forward pivot design illustrated herein improves forward driving function while reducing the spring requirements and cost.

The drive system can receive inputs from the controller 28 for driving the unit 12 across a floor. In particular, the left and right drive wheel module assemblies 130 can be operably coupled with the controller 28 for propelling the unit 12 across a floor, based on inputs from the various sensors discussed above. The drive wheel 30 can be driven in a forward or reverse direction in order to move the unit 12 forwardly or rearwardly. Furthermore, the left and right drive motors 138 can be operated simultaneously or individually in order to turn the unit 12 in a desired direction.

The autonomous vacuum cleaner 10 can be configured to move randomly about a surface while cleaning the floor surface, using input from the various sensors discussed above to change direction or adjust its course as needed to avoid obstacles, or can be configured to use a navigation and mapping system for guided navigation about the surface to be cleaned. In one example, the autonomous vacuum cleaner 10 includes a navigation and path planning system that is operably coupled with the drive system. The system builds and stores a map of the environment in which the autonomous vacuum cleaner 10 is used, and plans paths to methodically clean the available area.

Figure 12A:
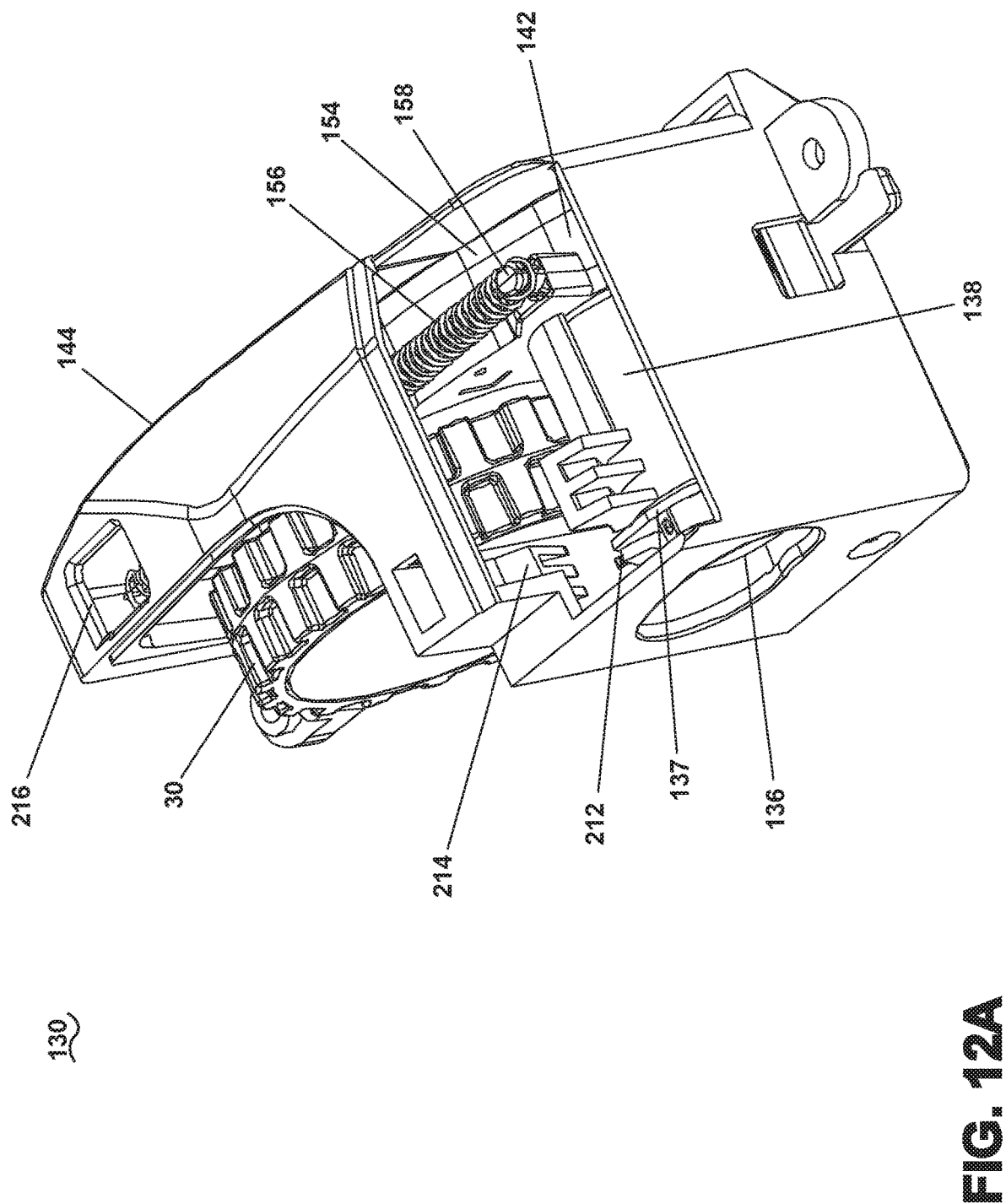
FIG. 12A is a perspective view of another example of a drive wheel module assembly.

In another example, shown in FIG. 12A, the PCB 137 for the drive wheel module assembly 130 can be mounted to the non-drive end of the motor casing, opposite the gear train 140 (FIG. 10), and can further comprise a wheel drop switch 212 configured to contact a rib 214 on the wheel module housing 144 when the drive wheel 30 loses contact with the cleaning surface, such as when the autonomous vacuum cleaner 10 is lifted off the surface to be cleaned. Power to the drive motor 138 is interrupted when the wheel drop switch 212 is actuated.

Also, in the example of FIG. 12A, the movable end of the extension spring 156 is still attached to a lever or lever arm 158 which extends from the pivot arm 142 above the pivot joint 146 between the pivot arm 142 and the module housing 144 that defines the pivot axis Z. A hole 216 can be provided in an upper wall of the module housing 144 such that the opposite end of the extension spring 156 can be fixed directly to the main housing 66 or top cover 68. Thus, the components of the drive wheel module assembly 130 are arranged so that the extension spring 156 applies force on the pivot arm 142, and therefore indirectly applies force on the drive wheel 30, and rotates the pivot arm 142 rearwardly about the pivot axis Z which forces the drive wheel 30 downwardly towards the surface to be cleaned so the drive wheel 30 engages the surface to be cleaned. In this manner, the drive wheel 30 can engage the surface to be cleaned to drive the vacuum cleaner 10 and can also automatically adjust to various contours of a floor surface, including different floor types like hard surfaces such as wood, tile, or linoleum, and soft surfaces such as carpets.

Figure 13:
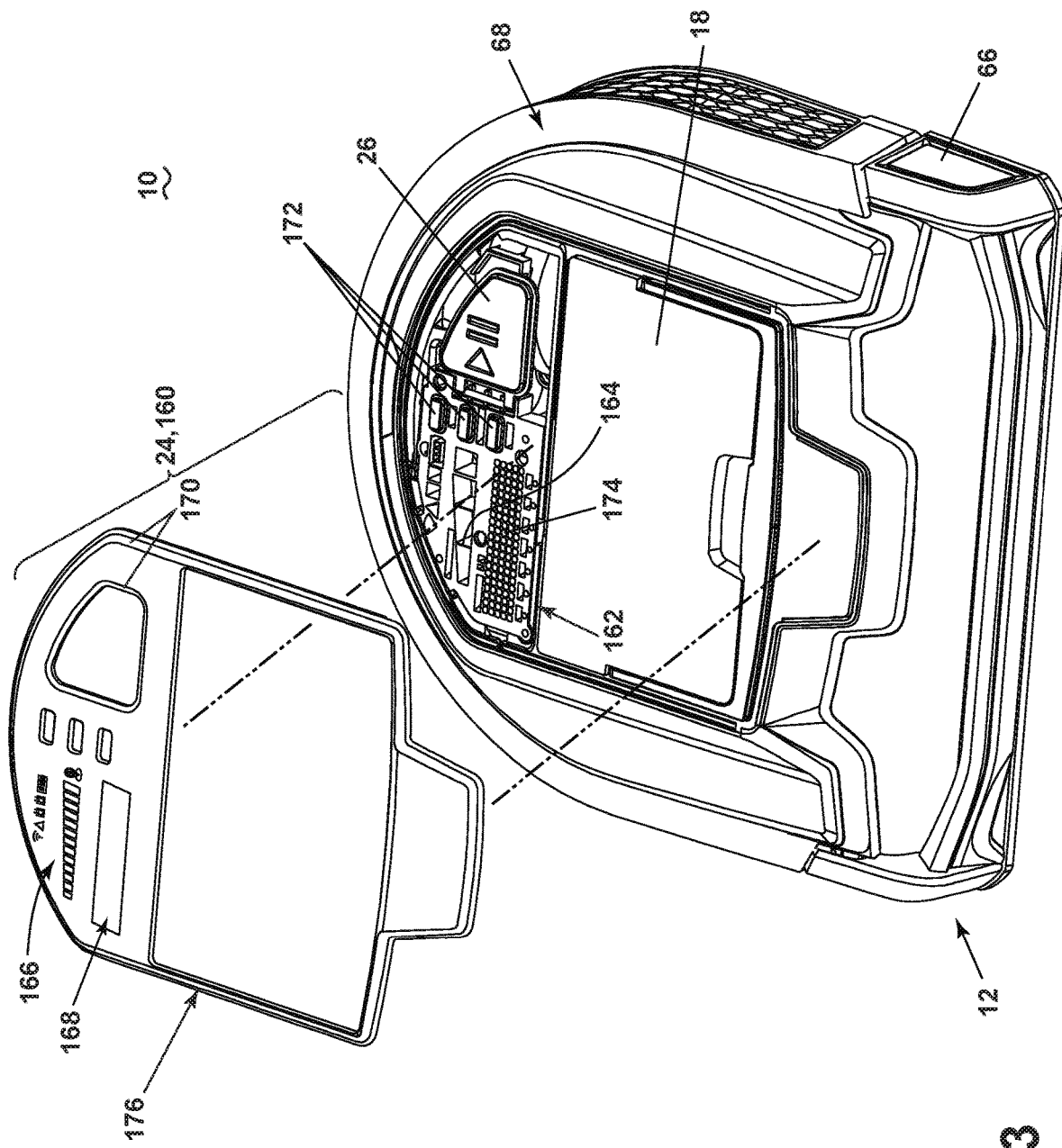
FIG. 13 is a partially exploded view of the autonomous vacuum cleaner of FIG. 2 showing components of the user interface.

With reference to FIGS. 2 and 13, the autonomous vacuum cleaner 10 can include the user interface 24 on the unit 12 for selection of an operation cycle for the autonomous vacuum cleaner 10 or otherwise controlling the operation of the autonomous vacuum cleaner 10. The user interface 24 can comprise an LED flexible matrix display 160. The flexible matrix display 160 can include a printed circuit board (PCB) 162, an isolator 164, a diffuser 166, a masking surface 168, and a decorative layer 170. In the example shown, the flexible matrix display 160 is provided on the top cover 68 of the housing 12. The user interface 24 shown comprises an opaque molded plastic part or trim component on the top cover 68, such as a cover plate 176, which encloses and protects portions of the flexible matrix display 160, while still allowing user access to the dirt bin 18, the power switch 26, and other buttons 172 provided thereon for selection an operation cycle or otherwise controlling the operation of the autonomous vacuum cleaner 10. The cover plate 176 shown comprises shaped cutouts for the dirt bin 18, power switch 26, and buttons 172.

In one example, in which at least a portion of the housing 12 is made from plastic, the user interface 24 can utilize in-mold decoration (or IMD; also called insert-mold decoration, in-mold labeling, or IML) to decorate the plastic surface of the housing 12 with color, graphics, light isolation, diffusing, and/or masking materials, and/or with an abrasion resistant coating. This manufacturing method strengthens the subassembly; IMD/IML creates a stiffer subassembly than a subassembly comprising separate components. In one example, the user interface 24 is manufactured using IMD/IML, and in the illustrated example, the trim component forms an exterior surface of the autonomous vacuum cleaner 10.

Using IMD/IML, several individual components can be integrated into a single IMD/IML component, such as the cover plate 176, the diffuser 166, the masking surface 168, and the decorative layer 170 configured for use with a scrolling text display, such as utilizing an LED array 174 on the PCB 162. As shown, the isolator 164 includes a portion that extends over the LED array 174, as well as around the power switch 26 for the power switch 26 and around the other buttons 172 of the user interface 24. The user interface 24 can optionally extend over and/or around other non-user interface components, such as around the dirt bin 18.

Figure 14:
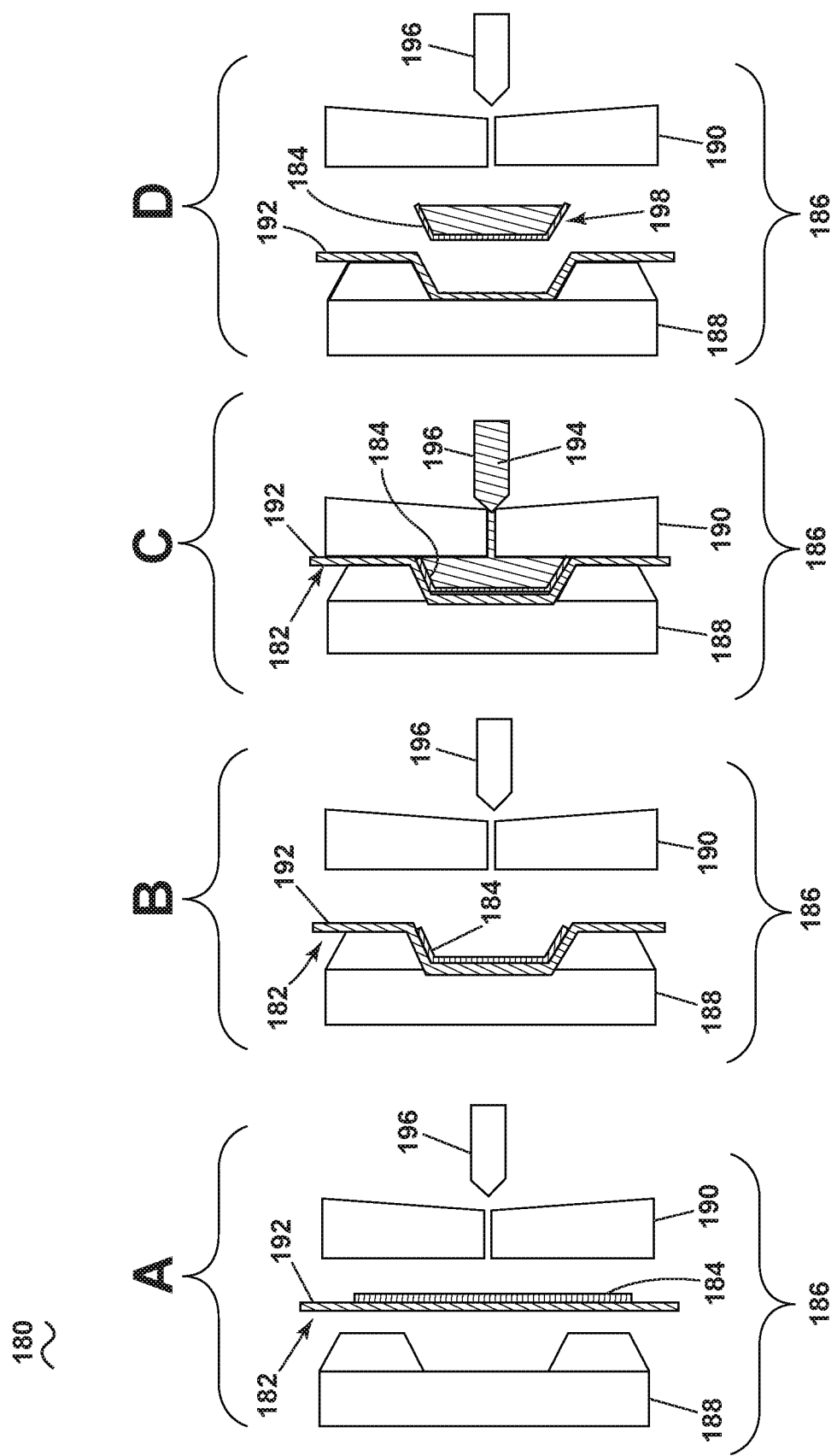
FIG. 14 is a schematic view of an in-mold decoration method for manufacturing a plastic component of an autonomous vacuum cleaner.
Figure 15:
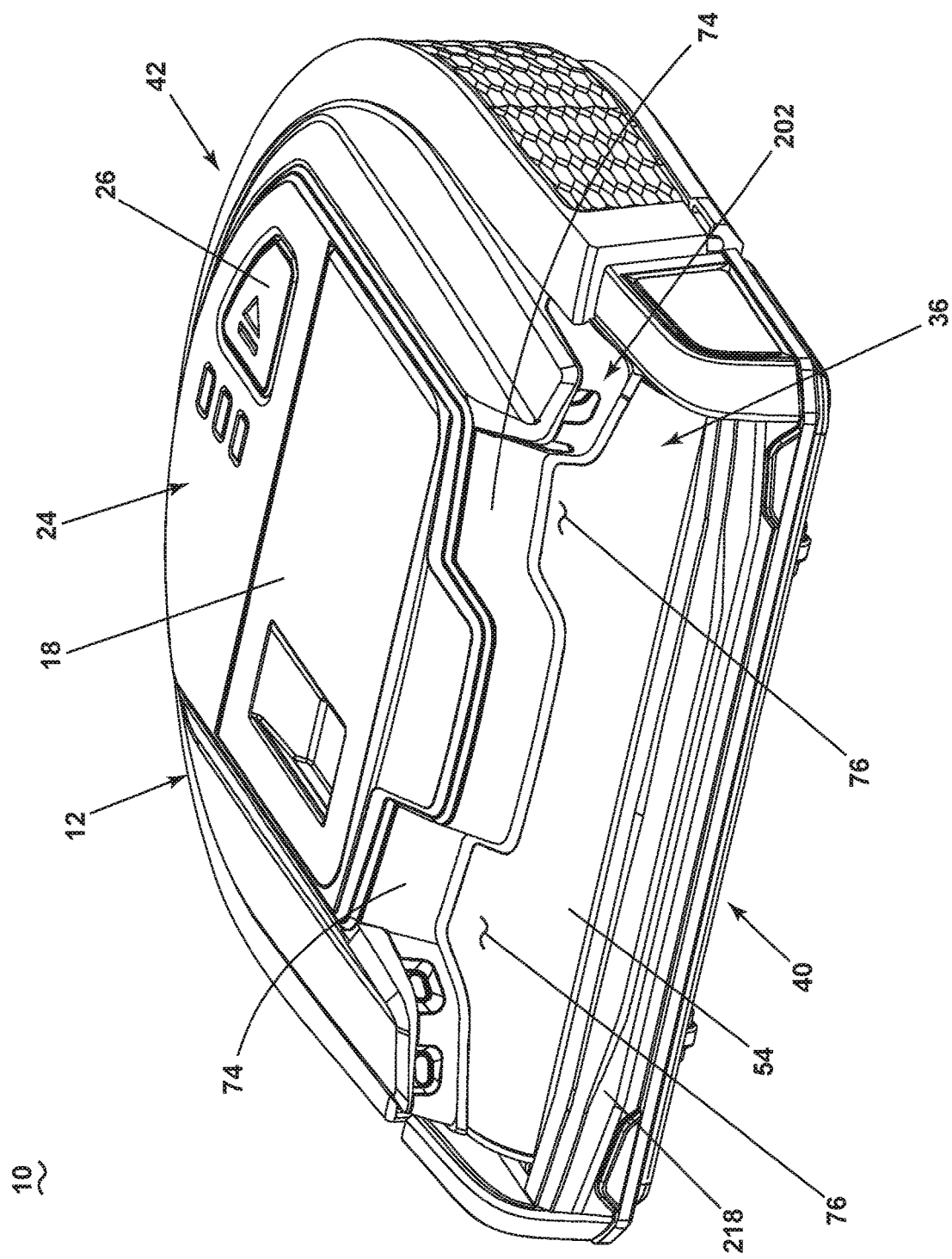
FIG. 15 is a perspective view of another example of the autonomous vacuum cleaner of FIG. 1.
Figure 16:
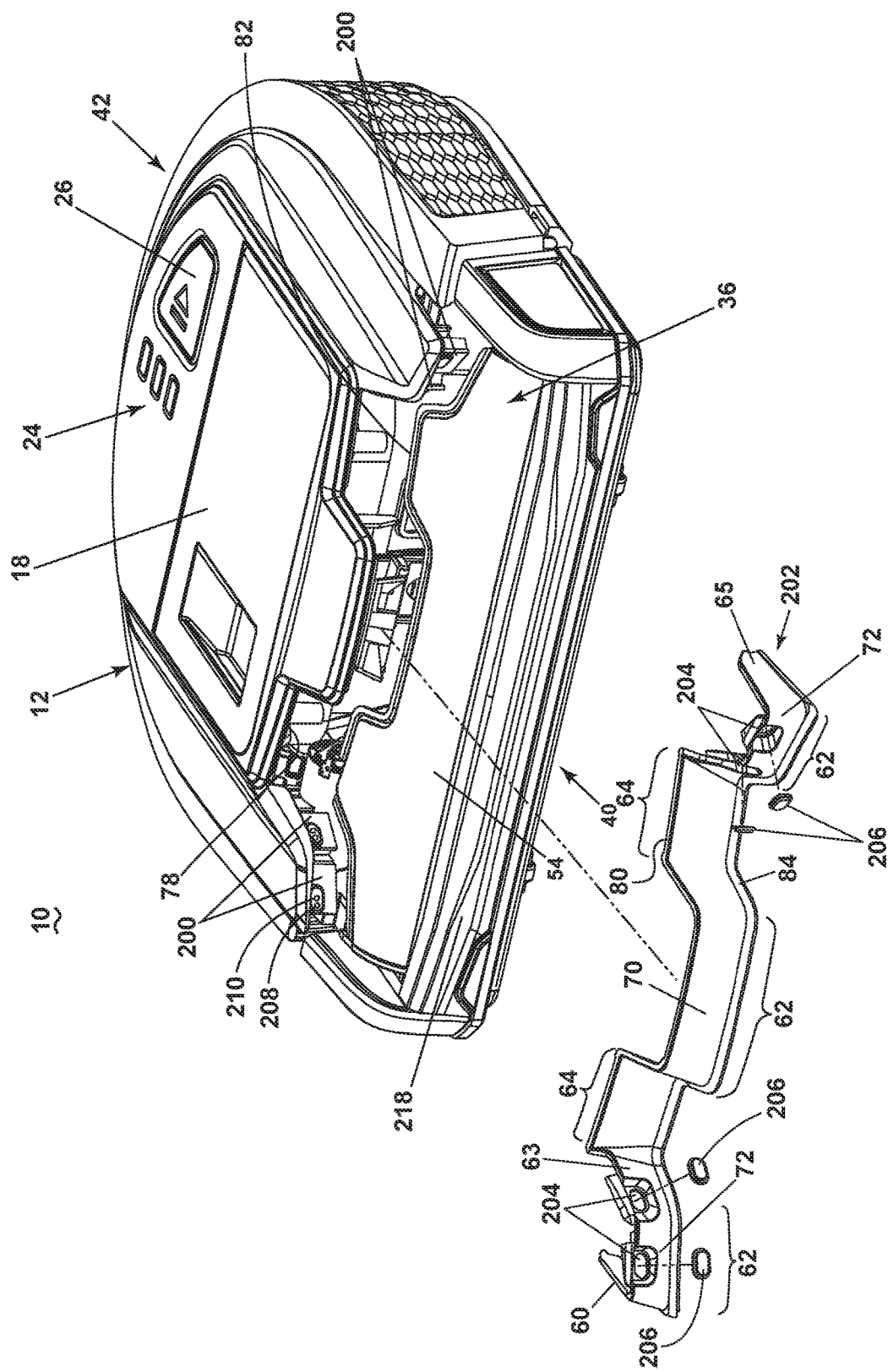
FIG. 16 is a partially exploded view of the autonomous vacuum cleaner of FIG. 15, showing details of a sensor cover.

A manufacturing method for decorating a plastic component of the autonomous vacuum cleaner can include the following steps. A schematic view of the manufacturing method is depicted in FIG. 14. As shown in step (a), a multi-layer graphic overlay or decorative film 182 on which a desired design 184 has been printed is fed into an injection mold 186, between two mold halves 188, 190 on a transfer foil or carrier film 192 prior to the plastic molding process. In one example, the different mask 168, diffusion 166 and decorative layers 170 are all printed on the film 192 prior to step (a).

A sensor (not shown) can be used to accurately position the film 182 within the mold 186. Once properly positioned, the film 182 can be clamped or otherwise affixed in place, and negative vacuum pressure applied to the film 182 to suction it against one of the mold halves 188, as shown in step (b). The mold 186 is then closed, and molten resin 194 is then injected via a nozzle 196 onto and around the film 182, as shown in step (c). The molten resin 194 solidifies into a shape that conforms with the cavity of the mold 186 to form a plastic component 198 for the vacuum cleaner. The design 184 transfers onto the component 198 while it is being molded, resulting in a single, integral component 198 that is more structurally robust than a multi-component assembly. The mold 186 is then opened, and the molded component 198, which can, for example, be the user interface cover plate 176 shown in FIG. 13, is removed, leaving the transfer foil/carrier film 192 behind, as shown in step (d). The spent carrier film 192 can be wound on a retraction reel (not shown) as a fresh supply of film is fed into the mold 186 prior to molding the next component.

The in-mold decoration process can eliminate labor and material cost associated with traditional post-molding decoration methods. For example, in-mold decoration eliminates the secondary assembly step of adhering a graphic or pad printing onto a molded plastic part, which avoids the costs of secondary assembly labor and adhesive and/or ink raw material. In a previous construction of a user interface for an autonomous vacuum cleaner, the user interface can include multiple separate components, including a surface mount LEDs on a PCB, an isolator comprising an opaque molded plastic part with shaped cutouts for the LED beams, a diffuser comprising a translucent film to spread light evenly, a mask comprising an opaque black material to block light, usually printed on diffuser film, and dead fronting comprising a translucent or tinted molded plastic cover to hide the other components from view by the user. Using an IMD/IML ink graphic, different ink layers and different ink colors can be included to create the diffuser, masking, and dead front features into a single, integral component, rather than multiple individual parts. The single component can optionally further be configured for use with scrolling text from an LED array.

It is further noted that the in-mold decoration process described herein, one example of which is embodied in the method 180, can be used for decorating a plastic component of non-autonomous vacuum cleaners and other surface cleaning apparatus.

FIGS. 15-21 show another example of the autonomous vacuum cleaner 10 of FIG. 1. In the example of FIGS. 15-21, like elements are referred to with the same reference numerals used in the example of FIG. 2. The autonomous vacuum cleaner 10 can be substantially similar to the autonomous vacuum cleaner 10 shown in FIG. 2, with the following exceptions.

The autonomous vacuum cleaner 10 can include time-of-flight (TOF) sensors 200 for position/proximity sensing. In the example illustrated, four TOF sensors 200 are provided, two near each side of the housing 12. The TOF sensors 200 are mounted to the housing 12, above the brushroll window 54, and behind a transparent or translucent portion of the housing 12. For example, the housing 12 can comprise a transparent or translucent sensor cover 202 for covering and protecting the sensors 200, while also admitting a light signal therethrough.

In the example illustrated, the sensor cover 202 is substantially identical to the sensor cover 58 described for the previous example, save for that the sensor cover 202 includes an opening 204 associated with each sensor 200 and which receives an individual lens insert 206 which cover the sensors 200. This configuration may be superior to the single, continuous sensor cover 58 of the FIG. 2 example, as it can more easily accommodate manufacturing tolerances. For the FIG. 2 example, the installation of the sensors 56 behind the single, continuous cover 58 may require more precision and dimensional control.

The openings 204 are spaced along the undulating vertical wall 60, and as shown, such that the lens inserts 206 are staggered. In the illustrated example, the two outboard openings 204 are provided on the side cover portions 72 of the forward wall sections 62 and the two inboard openings 204 are provided on the intermediate wall sections 63. In the example illustrated, the side cover portions 72 of the sensor cover 202 may be angled inwardly relative to the front edge 40, while the central portion 70 may be generally parallel to the front edge 40.

At least the lens inserts 206 can be a transparent or translucent material configured to filter out daylight and protect the sensors 200. A highly polished surface finish may be preferred. At least the lens inserts 206 may be plastic for durability, such as polycarbonate.

Each TOF sensor 200 can have an emitter 208 and a receiver 210. The TOF sensors 200 measure the time it takes for a light signal to travel from the emitter 208 to the receiver 210 for determining a precise distance to objects in proximity to the cleaner 10. The emitter 208 emits a pulsed light signal and can comprise an LED emitting the light signal. In one example, the LED can be an infrared LED emitting an infrared light beam. Input from the TOF sensors 200 is used by the controller 28 to slow down and/or adjust the course of the unit 12 when objects are detected by the sensors 200.

In the illustrated example, the emitter 208 and receiver 210 have a round shape and are mounted behind separate circular holes. Thus, both the emitter 208 and receiver 210 have a conical field of view, or sensing zone, and thus the entire TOF sensor 200 assembly also has a conical field of view, or sensing zone. The TOF sensors 200 can be oriented at varying angles near the front or front edge 40 of the vacuum cleaner 10. The varying angles may preferably each be a different angle which allows a field of view, or sensing zone, in both a forward and a side direction for each sensor 200. Such a field of view allows each sensor 200 to detect obstacles towards the front and sides of the autonomous vacuum cleaner 10.

The TOF sensors 200 can be staggered relative to the front and sides of the autonomous vacuum cleaner 10 so that the autonomous vacuum cleaner 10 can accurately determine when obstacles have been cleared. In the illustrated example, there are two sensors 200 on the left and right sides of the autonomous vacuum cleaner 10, where the left and right sides are defined relative to the front edge 40. The sensors 200 closer to the front edge 40 are leading sensors 200 and the sensors further from the front edge 40 are trailing sensors 200.

Figure 17:
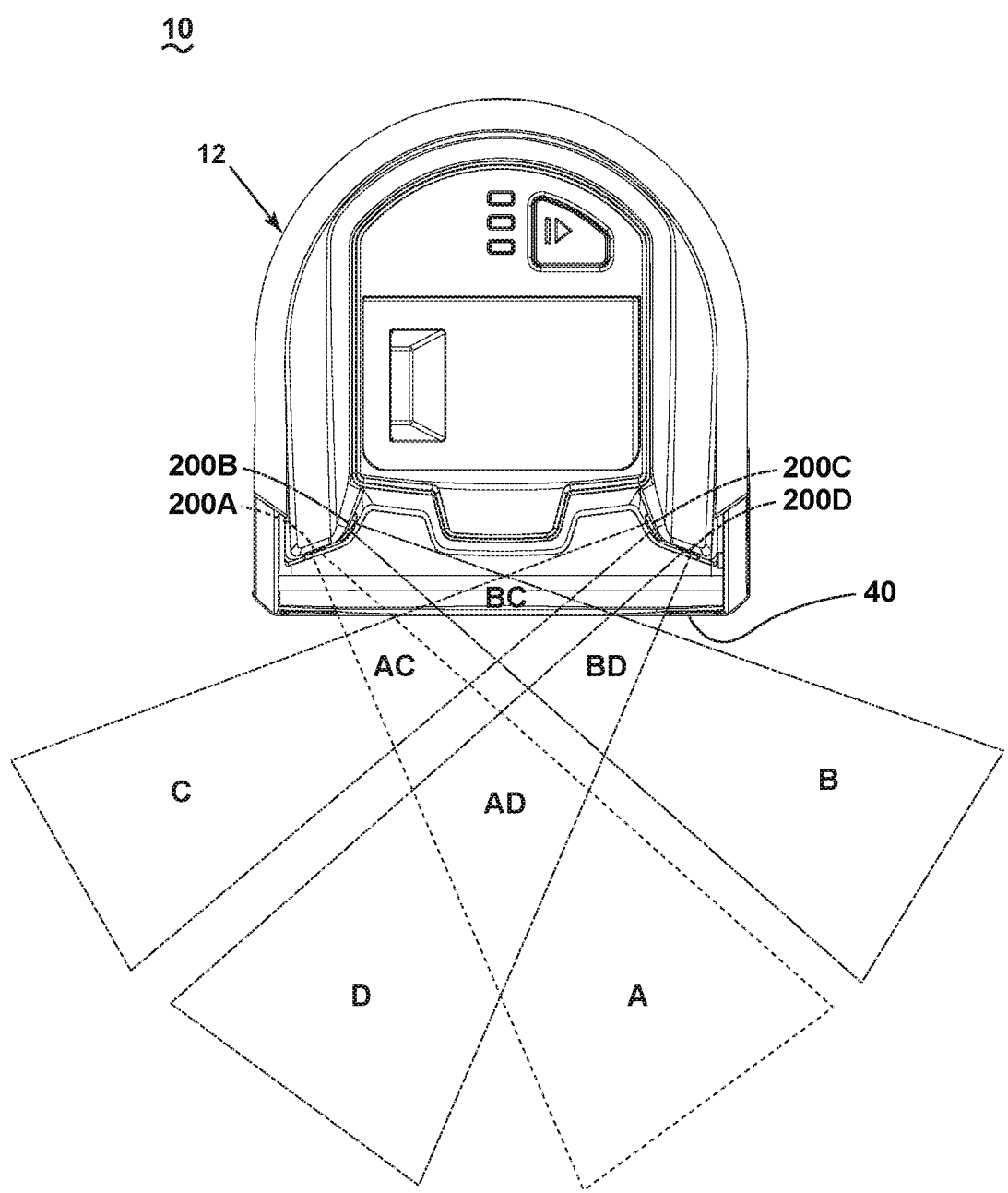
FIG. 17 illustrates a sensor coverage pattern of the autonomous vacuum cleaner of FIG. 15.
Figure 18:
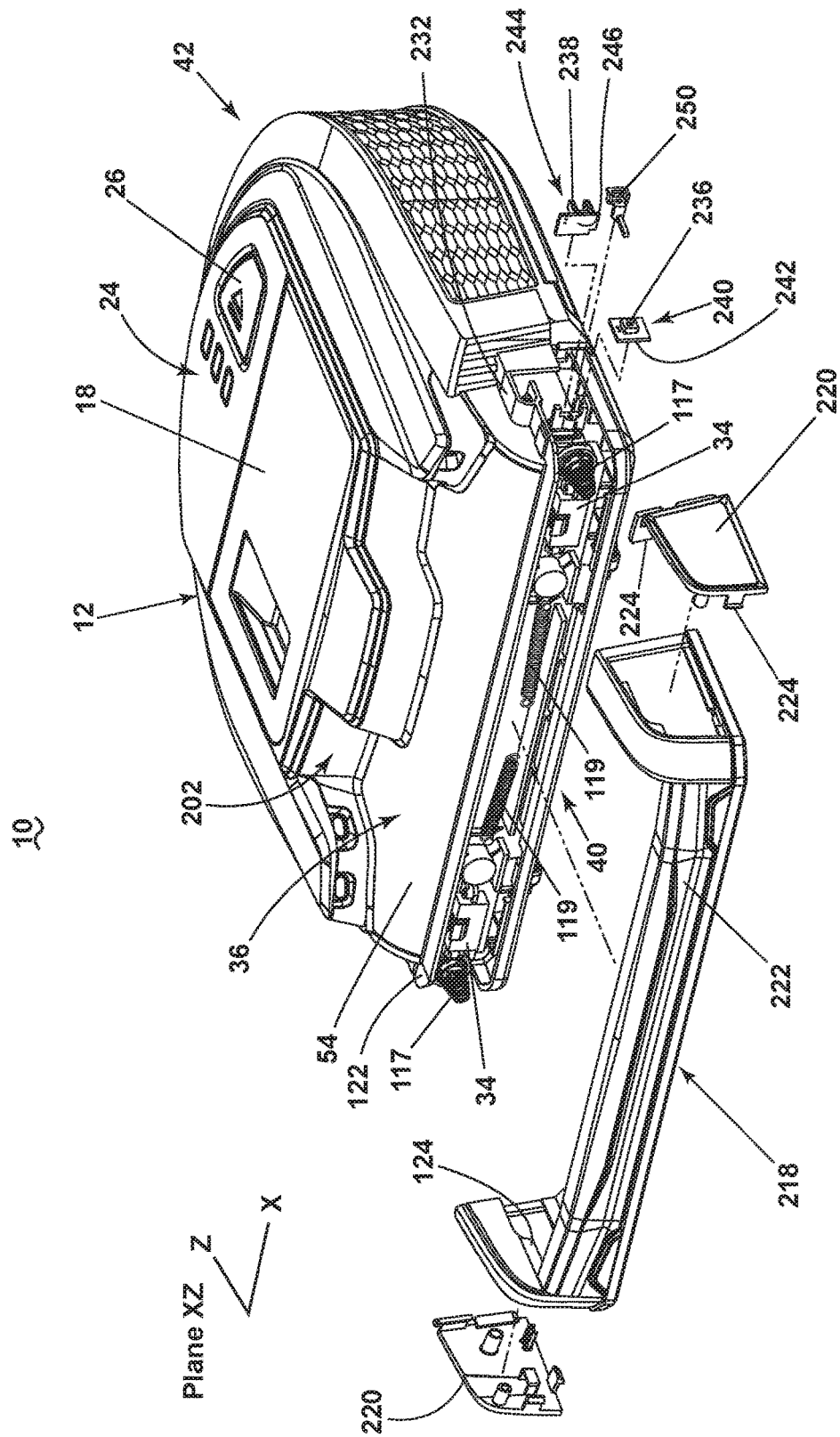
FIG. 18 is a partially exploded view of the autonomous vacuum cleaner of FIG. 15, showing details of a bumper assembly.
Figure 19:
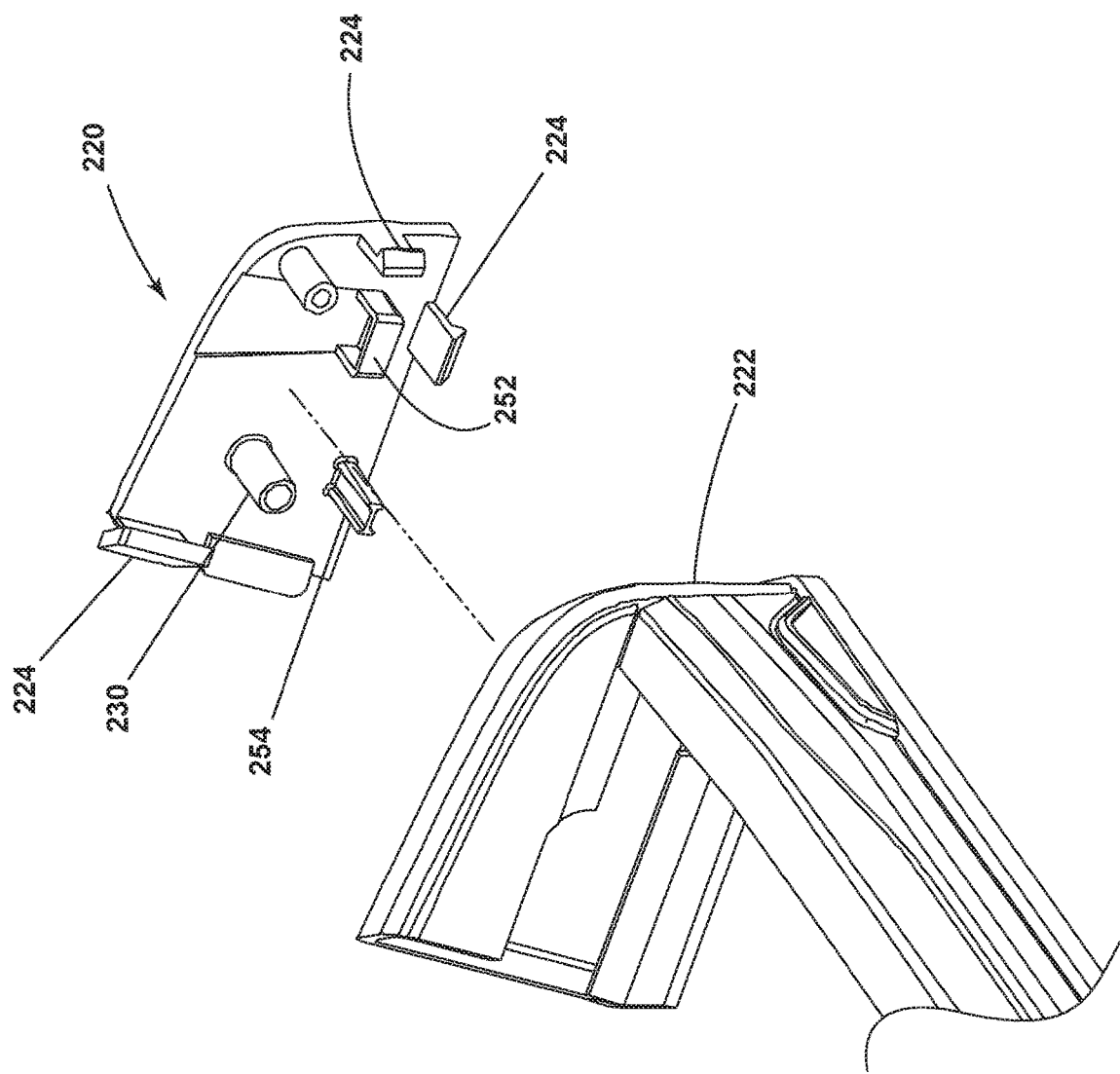
FIG. 19 is a partially exploded view of the bumper assembly of FIG. 18.
Figure 20:
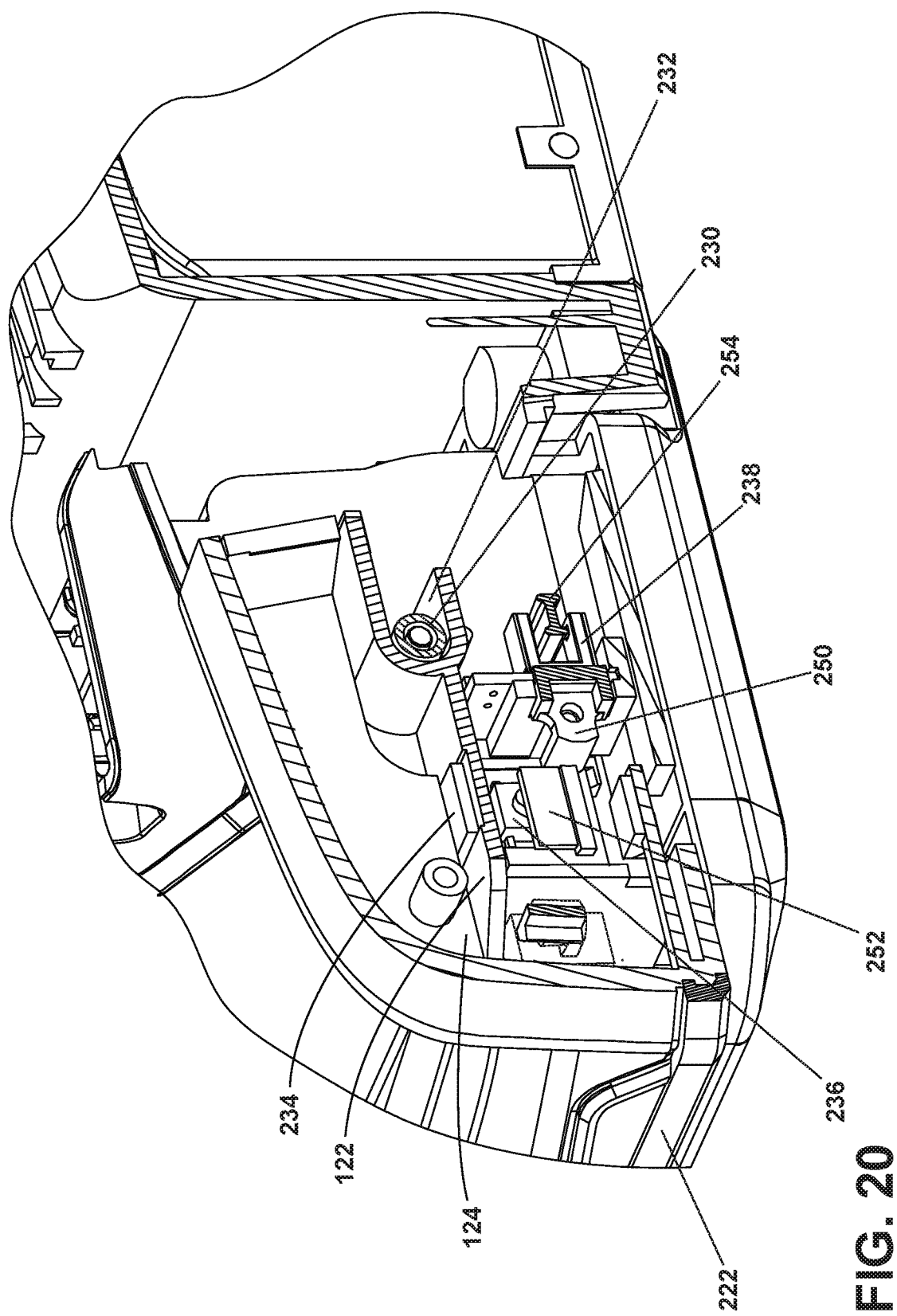
FIG. 20 is a close-up perspective view of the autonomous vacuum cleaner of FIG. 15, with an end cap and a portion of the main housing removed to show details of the bumper assembly.
Figure 21:
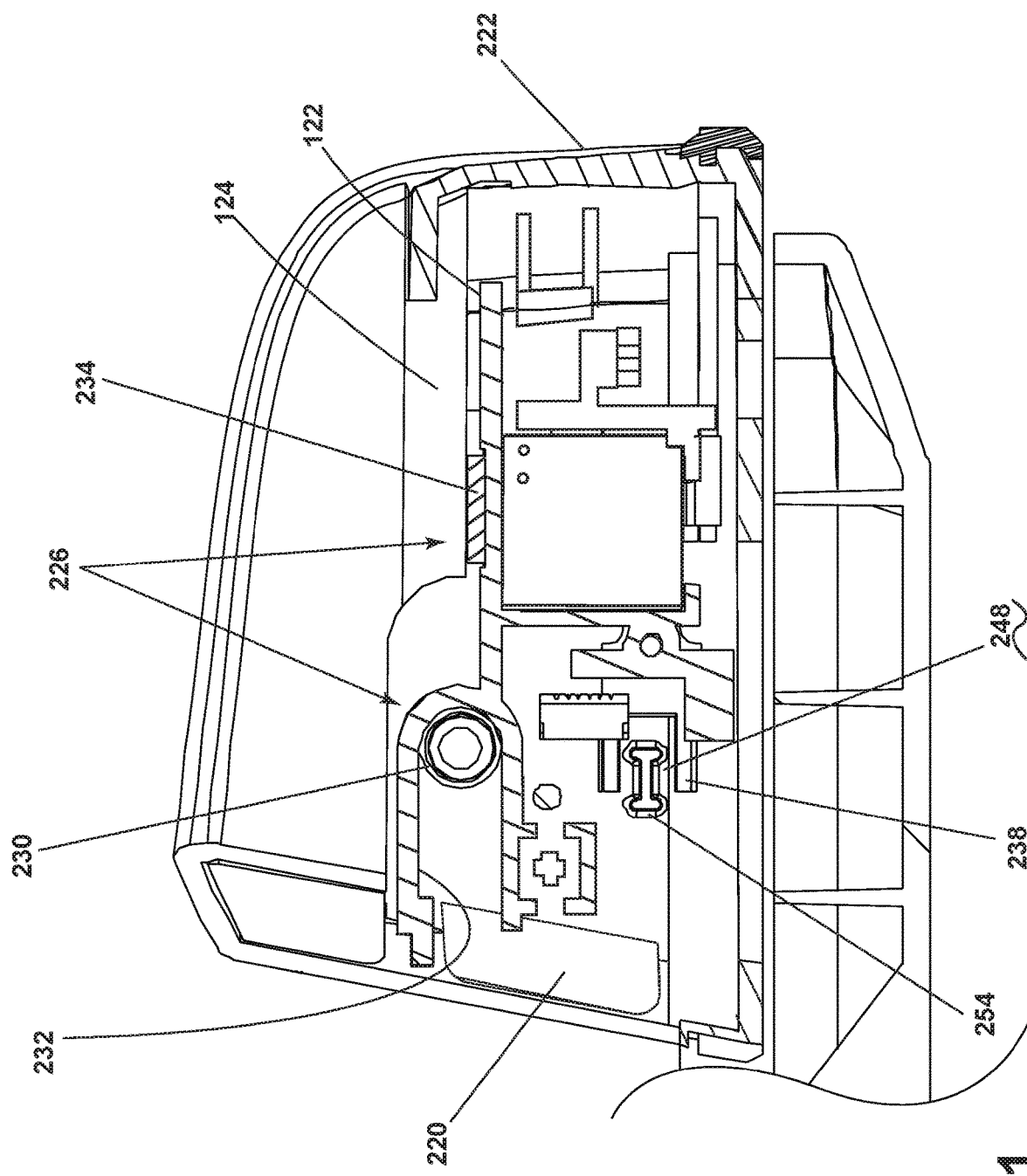
FIG. 21 is a sectional view through a portion of the bumper assembly, taken through an end cap of the bumper assembly.

FIG. 17 illustrates one example of a coverage pattern provided by the sensors 200 of the autonomous vacuum cleaner 10. The TOF sensors 200 on the left and right sides of the autonomous vacuum cleaner 10 can further be oriented to provide overlapping field of views. As the autonomous vacuum cleaner 10 travels over a floor surface, the field of view or sensing zone in which an object is sensed can change. This allows the autonomous vacuum cleaner 10 to accurately and precisely determine the fore/aft and lateral position of an object in proximity to the housing 12, and is superior to autonomous cleaners having dedicated forward- and/or side-facing sensors.

In the example shown, the outboard right-side sensor 200A has a field of view A, the inboard right-side sensor 200B has a field of view B, the inboard left-side sensor 200C has a field of view C, and the outboard left-side sensor 200D has a field of view D. The outboard sensors 200A, 200D closer to the front edge 40 are leading sensors and provide the furthest coverage via their respective fields of view A, D.

The inboard sensors 200B, 200C further from the front edge 40 are trailing sensors 200 and can provide greater lateral coverage via their respective fields of view B, C.

The right-side fields of view A and B are configured to overlap with the left-side fields of view C and D, creating zones of multiple sensor coverage. Starting from closest to the front of the autonomous vacuum cleaner 10, the zones of multiple sensor coverage include a zone BC, where the fields of view B and C of the two inboard sensors 200B and 200C overlap. Next, zones AC and BD are where the fields of view A and C of the outboard right-side sensor 200A and inboard left-side sensor 200C overlap and where the inboard right-side sensor 200B and outboard left-side sensor 200D overlap, respectively. The zones AC and BD are generally the same distance from the front of the autonomous vacuum cleaner 10, with zone AC being disposed closer to the right side of the front of the autonomous vacuum cleaner 10 and zone BD being disposed closer to the left side of the front of the autonomous vacuum cleaner 10. The outermost zone AD is where the fields of view A and D of the two outboard sensors 200A and 200D overlap.

In the illustrated example, the orientation of the TOF sensors 200 provides a total field of view that extends across the entire front edge 40 of the autonomous vacuum cleaner 10, and gets wider as the distance from the front edge 40 of the autonomous vacuum cleaner 10 increases. The orientation of the TOF sensors 200 includes both the angle and position relative to the front and sides of the autonomous vacuum cleaner 10.

Due to the overlapping fields of view shown in FIG. 17, the concentration of light signals emitted by the sensors 200 can be densest directly in front of the autonomous vacuum cleaner 10, i.e. immediately in front of the front edge 40, which improves the ability of the autonomous vacuum cleaner 10 to sense overhanging shelf conditions, such as cabinet toe kicks, appliances, and couches, which will help the autonomous vacuum cleaner 10 avoid jamming the brush chamber 36 under such obstacles, since this type of obstacle may not contact the bumper assembly 86 and trigger obstacle avoidance behavior.

In the present example, a dedicated wall following sensor can be eliminated. As the TOF sensors 200 are oriented at varying angles near the front of the autonomous vacuum cleaner 10, each of the TOF sensors 200 can sense forward and side obstacles, so there is no need for a separate dedicated wall following sensor. In addition, this configuration allows wall following on both sides of the autonomous vacuum cleaner 10, whereas the previous configuration shown in FIG. 2 only accommodated wall following on one side of the autonomous vacuum cleaner 10 since there was only a single dedicated wall following sensor 32 (see FIG. 9).

Rather than have a complete field of view high fidelity sensing array or camera, examples of the autonomous vacuum cleaner 10 use discrete distance sensors 56, 200 that provide a full field of view coverage in front of the autonomous vacuum cleaner 10. In some examples, the sensors 56, 200 can have overlapping fields of view, which allows for: (1) an object to be sensed anywhere in the front of the autonomous vacuum cleaner 10; (2) potential for an object to be sensed by two different sensors to provide localization and shape information; and (3) use of the extended range of the sensors for close proximity wall following, where the wall edge can be seen by sensing in one sensor and not another; and (4) a change in the pose and position of the autonomous vacuum cleaner 10 allows for fuzzy logic to be used to create a more accurate profile of the object in front of the autonomous vacuum cleaner 10.

FIGS. 18-21 show another example of a bumper assembly 218 for the autonomous vacuum cleaner 10 of FIG. 1. The bumper assembly 218 can be provided at the front of the unit 12, and may extend across front and side portions of the brush chamber 36 and/or brushroll window 54. The bumper assembly 218 is adapted for planar movement for sensing obstacles in front of and on the sides of the autonomous vacuum cleaner 10. The bumper assembly 218 is configured to slide multi-directionally along a plane XZ in response to front and side impacts, i.e. when the vacuum cleaner 10 strikes or collides with an object somewhere along the front or side of the vacuum cleaner 10. The plane XZ is defined by a generally horizontal plane or the surface over which the autonomous vacuum cleaner moves. The bumper assembly 218 of the present example comprises modular end caps 220, which can be snapped into opposite sidewalls of bumper 222 and retained by a plurality of mounting hooks 224 formed on the inner wall of each end cap 220. The modular end caps 220 comprise various sensor actuators and bearing surfaces for the bumper assembly 218 that will be discussed in detail below. The end caps 220 are modular, removable and replaceable and can thus provide a more facile bumper assembly process while also enhancing serviceability of the autonomous vacuum cleaner 10.

The bumper assembly 218 further includes a sliding joint 226 connecting the bumper 222 to the housing 12 for planar multi-directional movement along plane XZ. The sliding joint 226 can comprise a plurality of bearing surfaces between the bumper 222 and the main housing 66, at the sides and along the front of the main housing 66, to provide a stable connection therebetween.

The sliding joint 226 shown includes a post 230 formed on the inner wall of each bumper end cap 220 which is received in a U-shaped rib 232 provided on both sides of the main housing 66. Clearance is provided between the post 230 and the U-shaped rib 232 to allow the post 230 to slide planarly (i.e. front, back and side-to-side) within the U-shaped rib 232. Additional bearing surfaces can be provided between the rail 122 provided on the front of the brush chamber 36 above the cliff sensor 34 and hanger 124 on the rear of the bumper 222 that is received by the rail 122 in sliding engagement. The rail 122 and hanger 124 have front-to-back clearance therebetween permitting the bumper 222 to move planarly along plane XZ in response to front and side impacts. One or more wear pads 234 can be mounted on either of the rail 122 or hanger 124 to reduce friction therebetween and reduce excessive wear of contact surfaces on each part. The one or more wear pads 234 can comprise a rectangular pad about 1 mm thick and may comprise a wear-resistant thermoplastic material such as polyoxymethylene (POM), also known as acetal, and commercially available under the tradename Delrin®. Alternatively, the wear pads 234 can comprise a felt or blown fiber material.

The bumper assembly 218 interacts with bump sensors for determining side impacts and front impacts to the bumper 222. Two side bump sensors 240 in the form of tactile bump switch modules are mounted to opposite sidewalls of the brush chamber 36, behind the bumper 222. Each bump switch module 240 comprises a printed circuit board (PCB) 242 with a side-actuated bump switch 236, such as a tactile bump switch. Two front bump sensors 244 in the form of optical switch modules are mounted to opposite sidewalls of the brush chamber 36, rearward of the side bump sensors 240. Each optical switch module 244 comprises a printed circuit board (PCB) 246 with an optically-actuated switch 238, which can also be referred to as a slotted optical switch or photointerrupter, and further comprising an emitter and detector (not shown) spaced apart by an air gap 248 and configured to sense the presence or absence of a light beam. The side and front bump sensors 240, 244 are mounted to the housing by a clamp 250 retained by a fastener.

The bumper end cap 220 includes a side bump sensor actuator 252 and a front bump sensor actuator 254 for actuating the appropriate switch 240, 244, respectively, depending on the impact type. The front bump sensor actuator 254 shown comprises a rib on the inner wall of the end cap 220 that is configured to selectively dwell within the air gap 248 of the optically-actuated switch 238, depending on the position of the bumper 222, and more specifically, impacts on the bumper 222. The rib 254 is configured to normally dwell within the air gap 248 and block the beam of the optically-actuated switch 238 on the front bump sensor 244 such that the switch 238 will remain open. Conversely, the rib 254 will be displaced or moved planarly whenever the bumper 222 encounters a front impact, thereby vacating the air gap 248 and thus permitting the beam of the optically-actuated switch 238 to pass through the air gap 248 and be detected. Thus, front impacts to the bumper 222 displace rib 254 and cause the optical switch 238 to close.

The PCBs 242, 246 provided at a front side of the unit 12 are actuated with the separate side and front bump switches 240, 244 for discerning side or front impacts to the bumper assembly 218. Output signals from the PCBs 242, 246 provide inputs to the controller 28 for selecting an obstacle avoidance algorithm.

It is noted that as in the previous example, one or more forward return springs 117 can be provided between the front wall of the brush chamber 36 and the rear of the bumper 88 to bias the bumper 222 forwardly. In addition, one or more lateral return springs 119 can be provided between the front wall of the brush chamber 36 and the rear of the bumper 222 to bias the bumper 222 toward the center so that after a front or side impact force is removed, the bumper 222 will return to its original position in which the side bumper sensor actuator is spaced from the side bump sensor 240 and the front bumper sensor actuator 254 dwells in the air gap 248 of the front bump sensor 244.

To the extent not already described, the different features and structures of the various examples of the autonomous vacuum cleaners may be used in combination with each other as desired. That one feature may not be illustrated in all of the examples of autonomous vacuum cleaner is not meant to be construed that it cannot be, but is done for brevity of description. For example, the distance sensors and sensor cover, the brushroll window configuration, the dual-action bumper system, the drive system, and the filter interlock, and IMD component may be found singly or in any combination thereof on a vacuum cleaner. Still further, the autonomous vacuum cleaner can additionally have fluid delivery capability, including applying liquid or steam to the surface to be cleaned, and/or fluid extraction capability. Thus, the various features of the different examples of the autonomous vacuum cleaners may be mixed and matched as desired to form new examples, whether or not the new examples are expressly described.

While the disclosure has been specifically described in connection with certain specific examples thereof, it is to be understood that this is by way of illustration and not of limitation. For example, while illustrated on one example of an autonomous vacuum cleaner, it is understood that any of the features disclosed herein can be provided alone or in combination with each other. Reasonable variation and modification are possible within the scope of the foregoing description and drawings without departing from the spirit of the invention which is defined in the appended claims.

What is claimed is:

1. An autonomous vacuum cleaner, comprising:
    an autonomously moveable housing having a front, a rear, a first side, and a second side;
    a vacuum collection system carried by the autonomously moveable housing;
    a plurality of distance sensors carried by the autonomously moveable housing;
    a brushroll and a brush chamber in which the brushroll is mounted;
    a brushroll window cover disposed at the front of the autonomously moveable housing, in which the brushroll window cover is formed of a transparent material or a translucent material through which the brushroll may be viewed; and
    a sensor cover directly connected to the autonomously moveable housing and having a forward wall and a rear wall, the sensor cover covering the plurality of distance sensors; wherein the plurality of distance sensors are staggered relative to the front of the autonomously moveable housing above the brush chamber, and wherein each distance sensor of the plurality of distance sensors confronts a respective portion of the rear wall; wherein the sensor cover is set back relative to the front of the autonomously moveable housing to expose at least a portion of the brush chamber;
    wherein the sensor cover and the plurality of distance sensors are positioned above the brush chamber and in contact with the brushroll window cover, and wherein the sensor cover is set back from the front of the autonomously moveable housing such that the brushroll window cover is in front of the sensor cover relative to the front of the autonomously moveable housing.

2. The autonomous vacuum cleaner of claim 1 wherein the plurality of distance sensors have overlapping fields of view.

3. The autonomous vacuum cleaner of claim 2 wherein the overlapping fields of view are densest at the front of the autonomously moveable housing.

4. The autonomous vacuum cleaner of claim 2 wherein at least one of the plurality of distance sensors is angled to sense forward and side obstacles.

5. The autonomous vacuum cleaner of claim 1 wherein the sensor cover includes an opening associated with each of the plurality of distance sensors.

6. The autonomous vacuum cleaner of claim 5, further comprising a set of lens inserts in which each individual lens insert of the set of lens inserts covers a respective one ach of the plurality of distance sensors.

7. The autonomous vacuum cleaner of claim 6 wherein the sensor cover comprises an undulating, approximately vertical wall and the set of lens inserts are staggered therein.

8. The autonomous vacuum cleaner of claim 6 wherein the set of lens inserts comprises a transparent material or a translucent material configured to filter out daylight.

9. The autonomous vacuum cleaner of claim 6 wherein the autonomously moveable housing has a D-shape when viewed from above, with the rear of the autonomously moveable housing being defined by a rounded rear edge.

10. The autonomous vacuum cleaner of claim 1 wherein at least one of the plurality of distance sensors is angled to sense forward and side obstacles.

11. The autonomous vacuum cleaner of claim 10 wherein the plurality of distance sensors provide a total field of view that extends across an entire front of the autonomous moveable housing.

12. The autonomous vacuum cleaner of claim 1 wherein the sensor cover comprises an undulating, approximately vertical wall and the plurality of distance sensors are staggered therein.

13. The autonomous vacuum cleaner of claim 12 wherein at least one of the plurality of distance sensors is disposed closer to an outermost lateral portion of the first side of the autonomously moveable housing than a center of the front of the autonomously moveable housing and at least one other of the plurality of distance sensors is disposed closer to an outermost lateral portion of the second side of the autonomously moveable housing than the center of the front of the autonomously moveable housing.

14. The autonomous vacuum cleaner of claim 1 wherein at least one of the plurality of distance sensors is oriented at a different angle than at least one other of the plurality of distance sensors.

15. The autonomous vacuum cleaner of claim 1 wherein at least one of the plurality of distance sensors is disposed closer to an outermost lateral portion of the first side of the autonomously moveable housing than a center of the front of the autonomously moveable housing and at least one other of the plurality of distance sensors is disposed closer to an outermost lateral portion of the second side of the autonomously moveable housing than the center of the front of the autonomously moveable housing.

16. The autonomous vacuum cleaner of claim 15 wherein the at least one of the plurality of distance sensors disposed closer to the outermost lateral portion of the first side of the autonomously moveable housing has an overlapping field of view with the at least one other of the plurality of distance sensors disposed closer to the outermost lateral portion of the second side of the autonomously moveable housing.

17. The autonomous vacuum cleaner of claim 1 wherein the plurality of distance sensors includes at least one leading sensor and at least one trailing sensor, wherein the at least one trailing sensor is disposed farther from the front of the autonomously moveable housing than the at least one leading sensor.

18. An autonomous vacuum cleaner, comprising:
    an autonomously moveable housing having a front, a rear, a first side, and a second side;
    a vacuum collection system carried by the autonomously moveable housing;
    a plurality of distance sensors carried by the autonomously moveable housing;
    a sensor cover covering the plurality of distance sensors, wherein the plurality of distance sensors are staggered relative to the front of the autonomously moveable housing, and wherein the sensor cover extends continuously across the autonomously moveable housing from an outermost lateral portion of the first side to an outermost lateral portion of the second side, and wherein the sensor cover extends continuously over the plurality of distance sensors in a staggered formation;
    a brushroll and a brush chamber in which the brushroll is mounted;
    a brushroll window cover disposed at the front of the autonomously moveable housing, in which the brushroll window cover is formed of a transparent material or a translucent material through which the brushroll may be viewed;

wherein the sensor cover and the plurality of distance sensors are positioned above the brush chamber and in contact with the brushroll window cover, and wherein the sensor cover is set back from the front of the autonomously moveable housing such that the brushroll window cover is in front of the sensor cover relative to the front of the autonomously moveable housing; and wherein the sensor cover is set back relative to the front of the autonomously moveable housing to expose at least a portion of the brush chamber.

19. An autonomous vacuum cleaner, comprising:

an autonomously moveable housing having a front, a rear, a first side, and a second side;

a vacuum collection system carried by the autonomously moveable housing;

a plurality of distance sensors carried by the autonomously moveable housing;

a sensor cover covering the plurality of distance sensors;

wherein a first set of the plurality of distance sensors are disposed adjacent to an outermost lateral portion of the first side of the autonomously moveable housing and a second set of the plurality of distance sensors are disposed adjacent to an outermost lateral portion of the second side of the autonomously moveable housing, and wherein the first set and the second set of the plurality of distance sensors include a total field of view that extends through at least a portion of the sensor cover;

a brushroll and a brush chamber in which the brushroll is mounted;

a brushroll window cover disposed at the front of the autonomously moveable housing, in which the brushroll window cover is formed of a transparent material or a translucent material through which the brushroll may be viewed;

wherein the sensor cover and the plurality of distance sensors are positioned above the brush chamber and in contact with the brushroll window cover, and wherein the sensor cover is set back from the front of the autonomously moveable housing such that the brushroll window cover is in front of the sensor cover relative to the front of the autonomously moveable housing; and wherein the sensor cover is set back relative to the front of the autonomously moveable housing to expose at least a portion of the brush chamber.

* * * * *

UNITED STATES PATENT AND TRADEMARK OFFICE
CERTIFICATE OF CORRECTION

PATENT NO. : 11,751,743 B2
APPLICATION NO. : 16/794814
DATED : September 12, 2023
INVENTOR(S) : Jeffrey A. Scholten et al.

It is certified that error appears in the above-identified patent and that said Letters Patent is hereby corrected as shown below:

In the Claims

Claim 6, Column 17, Lines 53-54: "one ach of the plurality" should read --one of the plurality--

Signed and Sealed this
Twelfth Day of November, 2024

Katherine Kelly Vidal
*Director of the United States Patent and Trademark Office*